United States Patent
Ide

(10) Patent No.: US 11,180,142 B2
(45) Date of Patent: Nov. 23, 2021

(54) VEHICLE DRIVING SUPPORT APPARATUS

(71) Applicant: TOYOTA JIDOSHA KABUSHIKI KAISHA, Toyota (JP)

(72) Inventor: Hirohito Ide, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 16/144,096

(22) Filed: Sep. 27, 2018

(65) Prior Publication Data

US 2019/0092330 A1 Mar. 28, 2019

(30) Foreign Application Priority Data

Sep. 28, 2017 (JP) .............................. JP2017-187978

(51) Int. Cl.
*B60W 30/165* (2020.01)
*G01S 13/86* (2006.01)
(Continued)

(52) U.S. Cl.
CPC ........... *B60W 30/165* (2013.01); *G01S 13/66* (2013.01); *G01S 13/726* (2013.01); *G01S 13/867* (2013.01); *G01S 13/931* (2013.01); *B60W 10/04* (2013.01); *B60W 10/18* (2013.01); *B60W 10/20* (2013.01); *B60W 2050/046* (2013.01); *B60W 2420/52* (2013.01); *G01S 13/04* (2013.01); *G01S 2013/9318* (2020.01)

(58) Field of Classification Search
CPC .... B60W 10/18; B60W 30/165; B60W 10/04; B60W 10/20; B60W 2050/046; B60W 2420/52; B60W 2552/05; B60W 2552/2552; B60W 2552/30; B60W 2554/801; B60W 2554/802; B60W 30/18145; B60W 30/18163; G01S 13/66; G01S 13/867; G01S 13/04; G01S 13/726; G01S 13/931; G01S 2013/9318; B60K 2031/0016
See application file for complete search history.

(56) References Cited

U.S. PATENT DOCUMENTS

2001/0037165 A1 11/2001 Shirai et al.
2005/0270145 A1 12/2005 Kataoka et al.
(Continued)

FOREIGN PATENT DOCUMENTS

JP 2001-283391 A 10/2001
JP 2006-315491 A 11/2006
(Continued)

*Primary Examiner* — Hunter B Lonsberry
*Assistant Examiner* — Matthew J. Reda
(74) *Attorney, Agent, or Firm* — Sughrue Mion, PLLC

(57) ABSTRACT

A driving support ECU performs a following-travel steering control. The driving support ECU selects an other vehicle which is present on a traveling course of the own vehicle as a target candidate vehicle. When a specific condition is satisfied, the driving support ECU determines a preceding vehicle traveling on a traveling trajectory which has been generated up to a present time point as a following-travel steering target vehicle. When the specific condition is not satisfied, the driving support ECU determines the target candidate vehicle which has been selected in the present calculation timing as the following-travel steering target vehicle.

5 Claims, 8 Drawing Sheets

(51) Int. Cl.
*G01S 13/66* (2006.01)
*G01S 13/931* (2020.01)
*G01S 13/72* (2006.01)
*B60W 10/18* (2012.01)
*B60W 10/04* (2006.01)
*B60W 50/04* (2006.01)
*G01S 13/04* (2006.01)
*B60W 10/20* (2006.01)

(56) References Cited

U.S. PATENT DOCUMENTS

| | | | |
|---|---|---|---|
| 2006/0025918 A1 | 2/2006 | Saeki | |
| 2008/0249688 A1* | 10/2008 | Sawamoto | B60W 30/16 701/48 |
| 2014/0180569 A1* | 6/2014 | Ueda | B62D 15/025 701/400 |
| 2015/0109164 A1* | 4/2015 | Takaki | G01S 7/41 342/27 |
| 2016/0200317 A1* | 7/2016 | Danzl | B60W 10/10 701/25 |
| 2017/0053534 A1* | 2/2017 | Lokesh | H04L 67/12 |
| 2017/0057508 A1* | 3/2017 | Tamura | G05D 1/0231 |
| 2017/0066445 A1* | 3/2017 | Habu | B62D 15/026 |

FOREIGN PATENT DOCUMENTS

| | | |
|---|---|---|
| JP | 2008-195402 A | 8/2008 |
| JP | 4172434 B2 | 10/2008 |
| JP | 2009-190464 A | 8/2009 |
| JP | 4349210 B2 | 10/2009 |
| JP | 2010-6279 A | 1/2010 |
| JP | 4929777 B2 | 5/2012 |
| JP | 2014-148293 A | 8/2014 |
| JP | 2015-078926 A | 4/2015 |

* cited by examiner

VEHICLE DRIVING SUPPORT APPARATUS

BACKGROUND OF THE INVENTION

1. Field of the Invention

The present invention relates to a vehicle driving support apparatus configured to perform a steering control for causing an own vehicle to travel along a target traveling line determined/calculated based on a traveling trajectory of an other vehicle (a preceding vehicle) which travels in a front area of (ahead of) the own vehicle.

2. Description of the Related Art

A vehicle driving support apparatus (hereinafter, referred to as a "conventional apparatus"), which has been conventionally known, detects an other vehicle which travels in the surroundings of (around) the own vehicle through the use of a surroundings monitoring sensor (for example, radar sensor).

As is well known, the radar sensor radiates/emits a radar wave around the radar sensor and receives a reflected wave generated by reflection of the radiated radar wave at a three-dimensional object. The radar sensor recognizes the three-dimensional object as a target object, based on information (hereinafter, referred to as "reflection point information") on a reflection point included in the received wave. Furthermore, the radar sensor acquires/obtains information such as a position (for example, a longitudinal distance, and a lateral position or a direction) of the target object with respect to the own vehicle, a relative speed of the target object, and the like. The radar sensor gives/assigns identification information to each of the target objects, thereby identifying/specifying each of the target objects. Hereinafter, the identification information is referred to as a "target object ID". The target object IDs of the target objects are different from each other.

The conventional apparatus recognizes/selects one or more of the target objects which travel in the front area of (ahead of) the own vehicle from among the target objects detected through the use of the surroundings monitoring sensor, as one or more of the preceding vehicles. The conventional apparatus determines/specifies, from among one or more of the preceding vehicles which have been recognized, a preceding vehicle (hereinafter, referred to as a "following-travel steering target vehicle") to be a target for producing/generating a "traveling trajectory for determining a target traveling line", based on a behavior of the own vehicle. In other words, the conventional apparatus identifies/specifies the target object ID of the following-travel steering target vehicle. For example, the conventional apparatus calculates, based on the behavior of the own vehicle (a vehicle speed, a yaw rate, and the like, of the own vehicle), a curve radius of a traveling course of the own vehicle, and specifies/selects, as the following-travel steering target vehicle, the preceding vehicle having a high probability that the preceding vehicle is present on/in the traveling course which has the calculated curve radius.

The conventional apparatus generates/produces the traveling trajectory of the specified following-travel steering target vehicle to perform a steering control so as to cause the own vehicle to travel along the target traveling line determined/calculated based on the produced/generated traveling trajectory (for example, refer to Japanese Application Laid-Open No. 2001-283391).

For example, as shown in FIG. 6A, a case may occur where a second vehicle (102) cuts in between a first vehicle (101) specified as the following-travel steering target vehicle and the own vehicle SV at time t1. The target object ID of the following-travel steering target vehicle at the time t1 is "ID1".

Thereafter, as shown in FIG. 6B, when the second vehicle (102) further approaches the first vehicle (101) at time t2, a case may occur where the surroundings monitoring sensor recognizes a group of the first vehicle (101) and the second vehicle (102), as a single target vehicle (n1). In this case, the target object ID of that recognized target object (n1) takes over (inherits) the target object ID (that is, "ID1") of the first vehicle (101). That is, the target object ID of that recognized target object (n1) becomes the "ID1" that has been assigned to the first vehicle (101).

Thereafter, as shown in FIG. 8O, when the second vehicle (102) moves away/apart from the first vehicle (101) in a road width direction at time t3, the surroundings monitoring sensor recognizes the first vehicle (101) and the second vehicle (102) as target objects which are different from each other again. That is, the surroundings monitoring sensor distinguishes between the first vehicle (101) and the second vehicle (102). In this case, the surroundings monitoring sensor may determine that the second vehicle (102) is the same target object as the target object (n1). Accordingly, the second vehicle (102) may take over (inherit) the target object ID (that is, "ID1") of the target object (n1), and "ID3" which is a new target object ID may be assigned/given to the first vehicle (101).

Further, in this case, if the second vehicle (102) has a high probability that the second vehicle (102) is present on/in the traveling course of the own vehicle SV, the conventional apparatus erroneously/incorrectly specifies, as the following-travel steering target vehicle, "the second vehicle (102) having "ID1" as the target object ID at the time t3".

As a result, as shown in FIG. 6C, the own vehicle SV may not be able to continue traveling along a traveling lane stably, because the traveling trajectory L1 of the following-travel steering target vehicle changes toward (varies to follow) a position of the second vehicle (102). That is, in the above-mentioned case, there arises a problem that the steering support control with a low degree of accuracy (i.e., the degraded steering support control) is performed.

SUMMARY OF THE INVENTION

The present invention has been made in order to solve the above-described problem. That is, one of objects of the present invention is to provide a vehicle driving support apparatus capable of reducing "a possibility of performing a steering support control with a low degree of accuracy" even when and after an other vehicle approaching the following-travel steering target vehicle is present. Hereinafter, the vehicle driving support apparatus according to the present invention is also referred to as a "present invention apparatus".

The present invention apparatus includes:

target object information acquisition means (10, 17) for recognizing one or more of preceding vehicles traveling in a front area of an own vehicle (SV), and for acquiring target object information including a longitudinal distance and a lateral position of each one or more of the preceding vehicles with respect to the own vehicle (refer to step 810); and traveling control means (10) for performing a following-travel steering control to change a steering angle of the own vehicle in such a manner that the own vehicle travels along a target traveling line according to a traveling trajectory of a following-travel steering target vehicle selected from among one or more of the preceding vehicles, with use of the target object information of the following-travel steering target vehicle (refer to step 845);

the traveling control means being configured:

to select a target candidate vehicle among from one or more of the preceding vehicles based on the target object information and a traveling direction of the own vehicle which is extrapolated based on a driving state of the own vehicle (refer to step 825), the target candidate vehicle being a candidate of the following-travel steering target vehicle;

to determine, when the target candidate vehicle is selected while the following-travel steering control is not being performed (refer to a "No" determination at step 830), the selected target candidate vehicle as the following-travel steering target vehicle (refer to step 835);

to determine, when the target candidate vehicle is selected while the following-travel steering control is being performed (refer to a "Yes" determination at step 830), the selected target candidate vehicle as the following-travel steering target vehicle (refer to step 855) if the selected target candidate vehicle is a vehicle which is recognized to be different from an already-present target vehicle (refer to a "No" determination at step 850), the already-present target vehicle being the following-travel steering target vehicle whose target object information is being used in the following-travel steering control which is being performed;

to determine, when the target candidate vehicle is selected while the following-travel steering control is being performed, whether or not a specific condition is satisfied (refer to step 870 and step 875) if the selected target candidate vehicle is a vehicle which is recognized to be identical to the already-present target vehicle (refer to a "Yes" determination at step 850), the specific condition being a condition satisfied when both of a first condition and a second condition are satisfied, the first condition being a condition satisfied when the target candidate vehicle is traveling outside of a first predetermined area having a predetermined first distance in a lane width direction with respect to the traveling trajectory of the already-present target vehicle, and the second condition being a condition satisfied when a vehicle-on-trajectory different form the target candidate vehicle is present among the preceding vehicles, the vehicle-on-trajectory being an other vehicle which is traveling within a second predetermined area having a second predetermined distance in the lane width direction with respect to the traveling trajectory of the already-present target vehicle;

to determine the vehicle-on-trajectory as the following-travel steering target vehicle (refer to step 885), when it is determined that the specific condition is satisfied (refer to a "Yes" determination at each of step 870 and step 875); and to determine the selected target candidate vehicle as the following-travel steering target vehicle (refer to step 835), when it is determined that the specific condition is not satisfied (refer to a "No" determination any one of step 870 and step 875).

As described with reference to FIGS. 6A to 6C, when an other vehicle approaching a correct/proper following-travel steering target vehicle appears, and then that other vehicle moves away from the correct/proper following-travel steering target vehicle, a case may occur where that other vehicle is erroneously recognized as the following-travel steering target vehicle. Consequently, a case occurs where the following-travel steering control is performed based on the traveling trajectory of that other vehicle which is not a correct/proper following-travel steering target vehicle. If this happens, the own vehicle may not be able to continue traveling along the own vehicle traveling lane stably. That is, if the above-described case occurs, a steering support with a low degree of accuracy is performed.

In view of the above, the present invention apparatus determines, when the target candidate vehicle is selected while the following-travel steering control is being performed, the selected target candidate vehicle as a new following-travel steering target vehicle if the selected target candidate vehicle is a vehicle which is recognized to be different from the already-present target vehicle. The already-present target vehicle is the following-travel steering target vehicle whose target object information is being used in the on-going following-travel steering control. Furthermore, if the selected target candidate vehicle is a vehicle which is recognized to be identical to (the same as) the already-present target vehicle, the present invention apparatus determines whether or not the above-described specific condition is satisfied. Then, when it is determined that the specific condition is satisfied, the present invention apparatus determines the vehicle-on-trajectory (the other vehicle traveling in the vicinity of the traveling trajectory of the already-present target vehicle) as the following-travel steering target vehicle. In contrast, when it is determined that the specific condition is not satisfied, the present invention apparatus determines the selected target candidate vehicle as the following-travel steering target vehicle.

As understood from FIGS. 6A to 6C, both of the above-described first condition and the above-described second condition are satisfied so that the specific condition is satisfied, when an other vehicle (second vehicle (102) shown in FIG. 6A) which has approached the original (proper) following-travel steering target vehicle (first vehicle (101) shown in FIG. 6A) moves away from the original (proper) following-travel steering target vehicle in the road width direction. When the above-described specific condition is satisfied, the vehicle-on-trajectory (the first vehicle (101) shown in FIG. 6C) can be determined/considered to be appropriate/suitable for the following-travel steering target vehicle. Therefore, the present invention apparatus determines that vehicle-on-trajectory as the following-travel steering target vehicle.

This can reduce the possibility that the "other vehicle which moves away from the correct/proper following-travel steering target vehicle after approaching the correct/proper following-travel steering target vehicle" is erroneously determined to be the following-travel steering target vehicle. In other words, the preceding vehicle appropriate/suitable for the following-travel steering target vehicle can be selected as the following-travel steering target vehicle. Thus, the possibility that the steering support with a low degree of accuracy is performed can be decreased.

In one of aspects of the present invention apparatus, the traveling control means is configured to determine that the specific condition is satisfied, when a third condition is further satisfied in addition to the first condition (refer to step 880) and the second condition (refer to a "Yes" determination at step 880), the third condition being a condition satisfied when a magnitude of a difference between the longitudinal distance of the target candidate vehicle and the longitudinal distance of the vehicle-on-trajectory is equal to or smaller than a predetermined value.

As understood from FIG. 6C, when the other vehicle (the second vehicle 102 shown in FIGS. 6A to 6C) which has approached the original/proper following-travel steering target vehicle (the first vehicle 101 shown in FIGS. 6A to 6C) moves away from the original/proper following-travel steering target vehicle in the road width direction, the original/proper following-travel steering target vehicle should be present near the other vehicle in the direction of the longitudinal distance (road traveling direction). In other words, if the third condition is satisfied, the possibility further increases that the other vehicle is not an appropriate/proper following-travel steering target vehicle but the vehicle-on-trajectory is the appropriate/proper following-travel steering target vehicle. Therefore, according to the above-mentioned aspect, the preceding vehicle appropriate/suitable for the following-travel steering target vehicle can be more surely selected as the following-travel steering target vehicle.

In one of aspects of the present invention apparatus, the traveling control means is configured to perform the following-travel steering target control while using the target object information of the already-present target object as the target object information of the vehicle-on-trajectory vehicle (refer to step 885, step 840, and step 845), when determining that the specific condition is satisfied to determine the vehicle-on-trajectory as the following-travel steering target vehicle.

According to the above-mentioned aspect, when the vehicle-on-trajectory which is highly likely to be the same vehicle as the already-present target vehicle is determined as the following-travel steering target vehicle, a highly accurate "traveling trajectory of the appropriate/proper following-travel steering target vehicle" can be produced/generated. As a result, a steering support control with higher degree of accuracy can be performed.

In one of aspects of the present invention apparatus, the traveling control means is configured, when determining that the specific condition is not satisfied to determine the selected target candidate vehicle as the following-travel steering target vehicle, to perform the following-travel steering control, without using the target object information of the target candidate vehicle which has been acquired by a time point at which the selected target candidate vehicle is determined as the following-travel steering target vehicle, but with using the target object information of the target candidate vehicle which is acquired after the time point (refer to step 860, step 840, and step 845).

According to the above-mentioned aspect, when the target candidate vehicle which is highly likely to be different from the already-present target vehicle is determined as the following-travel steering target vehicle, the traveling trajectory is not affected by the already-present traveling trajectory of the already-present target vehicle. Accordingly, a steering support control with high degree of accuracy can be performed.

In one of aspects of the present invention apparatus, the target object information acquisition means includes a surroundings monitoring sensor (17) including a radar sensor (17a) and a camera sensor (17b);

the target object information acquisition means is configured to acquire the target object information (refer to step 810), every time a predetermined time elapses, based on at least one set of:
  radar sensor detection information acquired from the preceding vehicle by the radar sensor, and
  camera sensor detection information acquired from the preceding vehicle by the camera sensor; and
the traveling control means is configured:

to generate the traveling trajectory based on a plurality sets of the target object information acquired from the following-travel steering target vehicle (refer to step 840); and to generate the traveling trajectory in such a manner that a degree to which one sensor detection target object information is reflected in the traveling trajectory, when the target object information is the one sensor detection target object information is smaller than a degree to which two sensors detection target object information is reflected in the traveling trajectory, when the target object information is the two sensors detection target object information,
  the one sensor detection target object information being information detected based on only either the radar sensor detection information or the camera sensor detection information, and
  the two sensors detection target object information being information detected based on both of the radar sensor detection information and the camera sensor detection information.

According to the above-mentioned aspect, the one sensor detection target object information having low degree of detection accuracy is hard to be reflected in (affect) the traveling trajectory of the following-travel steering target vehicle, as compared with the two sensors detection target object information having high degree of detection accuracy, so that a traveling trajectory with higher degree of accuracy can be produced/generated. As a result, a steering support control with higher degree of accuracy can be performed.

In the above description, references used in the following descriptions regarding embodiments are added with parentheses to the elements of the present invention, in order to assist in understanding the present invention. However, those references should not be used to limit the scope of the invention.

BRIEF DESCRIPTION OF THE DRAWINGS

FIG. 4A is a plan view for illustrating the lane keeping control.

FIG. 4B is a numerical expression for explaining relationship between coefficients of a cubic function of a traveling trajectory and a curvature and the like.

FIG. 4C is the numerical expression for explaining the relationship between coefficients of the cubic function of the traveling trajectory and the curvature and the like.

DETAILED DESCRIPTION OF THE PREFERRED EMBODIMENT

Figure 1:
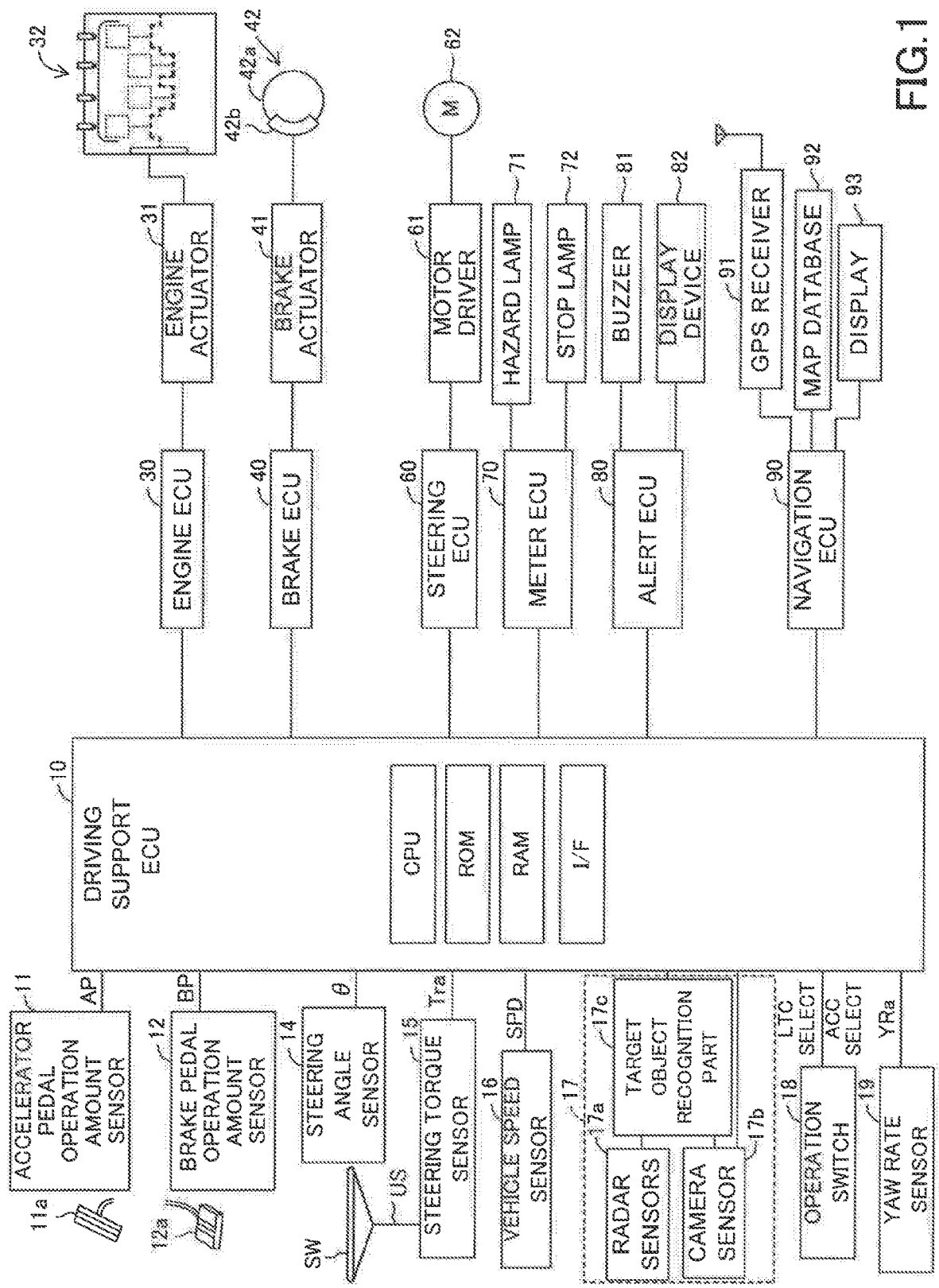
FIG. 1 is a schematic configuration diagram for illustrating a vehicle driving support apparatus according to an embodiment of the present invention.

A vehicle driving support apparatus (hereinafter, also referred to as a "present embodiment apparatus") according to an embodiment of the present invention will be described below, referring to drawings. The present embodiment apparatus is also a vehicle traveling control apparatus. It should be noted that, throughout all of the drawings, the same reference numerals are assigned to the same or corresponding parts.

<Construction>

As shown in FIG. 1, the present embodiment apparatus is applied to a vehicle (an automobile). The vehicle to which the present embodiment apparatus is applied is also referred to as an "own vehicle" to distinguish the vehicle from other vehicles. The present embodiment apparatus includes a driving support ECU 10, an engine ECU 30, a brake ECU 40, a steering ECU 60, a meter ECU 70, an alert ECU 80, and a navigation ECU 90. It should be noted that the driving support ECU 10 is simply referred to (expressed) as a "DSECU", in the following description.

Each of those ECUs is an electronic control unit comprising a microcomputer as a main part. The ECUs are connected with each other via a CAN (Controller Area Network) which is not illustrated so that they are capable of mutually transmitting and receiving information. The microcomputer includes a CPU, a ROM, a RAM, a non-volatile memory, an interface I/F, and the like. The CPU is configured to realize/achieve various functions by executing instructions (programs, routines) stored in the ROM. Some or all of these ECUs may be integrated into a single ECU.

The DSECU is connected to sensors (including switches) described below, and is configured to receive a detection signal or an output signal of each of the sensors. It should be noted that each of the sensors may be connected to one of the ECUs other than the DSECU. In this case, the DSECU receives the detection signal or the output signal of the sensor via CAN from the ECU connected to that sensor.

An accelerator pedal operation amount sensor 11 is configured to detect an operation amount (an accelerator opening degree) of an accelerator pedal 11a of the own vehicle to output a signal indicative of the detected operation amount (the accelerator pedal operation amount AP).

A brake pedal operation amount sensor 12 is configured to detect an operation amount of a brake pedal 12a to output a signal indicative of the detected operation amount (the brake pedal operation amount BP).

A steering angle sensor 14 is configured to detect a steering angle of the own vehicle to output a signal indicative of the detected steering angle (the steering angle θ).

A steering torque sensor 15 is configured to detect a steering torque applied to a steering shaft US of the own vehicle by an operation of the steering wheel SW to output a signal indicative of the detected steering torque (the steering torque Tra).

A vehicle speed sensor 16 is configured to detect a traveling speed (a vehicle speed) of the own vehicle to output a signal indicative of the detected vehicle speed (the vehicle speed SPD).

A surroundings monitoring sensor 17 includes a radar sensor 17a, camera sensor 17b, and a target object recognition part 17c. The surroundings monitoring sensor 17 is configured to acquire/obtain information on at least a road in front (ahead) of the own vehicle and a three-dimensional object which is present in that road. For example, the three-dimensional objects include moving objects such as pedestrians, bicycles, and automobiles, and stationary objects such as utility poles, trees and guardrails. Hereinafter, these three-dimensional objects may be referred to as "target objects" in some cases.

The surroundings monitoring sensor 17 is configured to determine whether or not the target object is present, and calculate "information (hereinafter, referred to as "target object information") on a target object (n)", based on the information obtained by at least any one of the radar sensor 17a and the camera sensor 17b. The target object information includes "a longitudinal distance Dfx(n), a lateral position Dfy(n), a relative speed Vfx(n), and the like" of the target object (n) as well as a target object ID specifying/identifying the target object (n). The surroundings monitoring sensor 17 is configured to output the calculated target object information of/on the target object (n).

Figure 2:
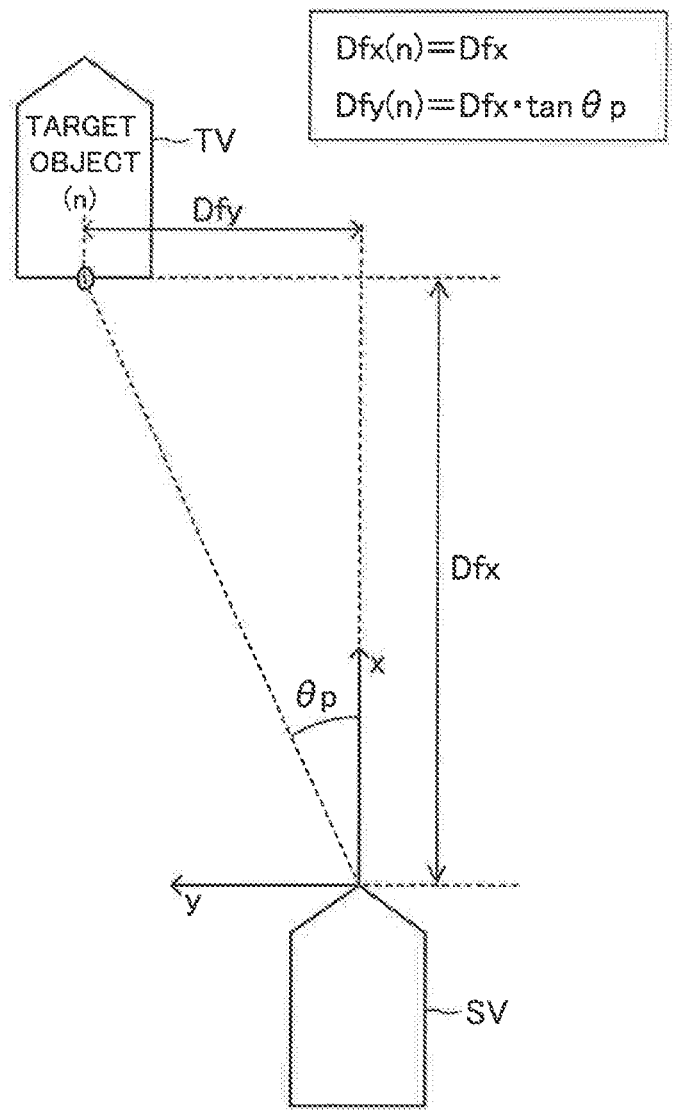
FIG. 2 is a plan view for illustrating a lane keeping control.

It should be noted that the surroundings monitoring sensor 17 acquires/obtains these values of the target object information using predefined x-y coordinate system (refer to FIG. 2).

An X axis is a coordinate axis which extends along a longitudinal direction of the own vehicle so as to pass through a center position in a vehicle width direction of a front-end part of the own vehicle SV. The X axis defines a positive coordinate value for a position in a front direction of the own vehicle SV.

A Y axis is a coordinate axis which is orthogonal to the X axis. The V axis defines a positive coordinate value for a position in a left direction of the own vehicle SV.

Each of an origin of the X axis and an origin of the V axis is at the center position of the front-end part of the own vehicle SV in the vehicle width direction. An X coordinate position in the x-y coordinate system is referred to as a "longitudinal distance Dfx". A Y coordinate position in the x-y coordinate system is referred to as a "lateral position Dfy".

As shown in FIG. 2, the longitudinal distance Dfx(n) of the target object (n) is a distance (having a sign of plus or minus) in a center axis direction (an x axis direction) of the own vehicle between the front-end part of the own vehicle and the rear-end part of the target object (n). For example, the target object (n) is the preceding vehicle TV.

The lateral position Dfy(n) of the target object (n) is a distance (having a sign of plus or minus) between a center position of the target object (n) and the central axis of the own vehicle in a direction (a V axis direction) orthogonal to the central axis of the own vehicle. For example, the center position of the target object (n) is a center position of the rear-end part of the preceding vehicle in the vehicle width direction.

The relative speed Vfx (n) of the target object (n) is a difference (=Vs−Vj) between a speed Vs of the target object (n) and the speed Vj (=SPD) of the own vehicle. The speed Vs of the target object (n) is a speed of the target object (n) in the center axis direction (the x axis direction) of the own vehicle.

More specifically, the radar sensor 17a shown in FIG. 1 includes a radar wave transmitting/receiving part and a processing part. The radar wave transmitting/receiving part transmits/emits electric waves (hereinafter, referred to as a "millimeter wave") in a millimeter waveband to peripheral areas (surroundings) including at least a front area of the own vehicle, and receives reflected waves generated through the reflection of the transmitted millimeter waves at a part (that is, a reflection point) of a three-dimensional object. It should be noted that the radar sensor 17a may be a radar sensor using electric waves (radar waves) in a frequency band other than the millimeter waveband.

The processing part of the radar sensor 17a determines absence or presence of the target object (whether or not the target object is present), based on reflection point information including a phase difference between the transmitted millimeter wave and the received reflected wave, an attenuation level of the reflected wave, and a time (period) from when the millimeter wave is transmitted to when the reflected wave corresponding to the transmitted wave is received. The processing part of the radar sensor 17a performs grouping (integrating, fusing) "a plurality of the reflection points" which are highly likely to be obtained from a single three-dimensional object to recognize/regard "a group of the grouped reflection points" as "a target object (a single target object)". The processing part assigns/gives a target object ID which is identification information for identifying/specifying each of the target objects (single target object) to the recognized target object. Furthermore, the processing part of the radar sensor 17a calculates radar sensor detection information based on the reflection point information. The radar sensor detection information includes the longitudinal distance Dfx of the target object, a direction θp of the target object with respect to the own vehicle, the relative speed Vfx between the own vehicle and the target object, and the like.

The camera sensor 17b includes a stereo camera and an image processing part. The stereo camera photographs (takes an image of) views/landscapes of "the left side area and the right side area" and in front of (ahead of) the own vehicle so as to acquire a pair of left and right image data (images of the views/landscapes). The image processing part determines whether or not the target object is present within areas photographed by the stereo camera, based on that pair of right and left image data. When it is determined that the target object is present, the image processing part calculates the direction θp of the target object, the longitudinal distance Dfx of the target object, "the relative speed Vfx between the own vehicle and that target object, and the like (hereinafter, referred to as "camera sensor detection information")".

The target object recognition part 17c is communicably connected to each of the processing part of the radar sensor 17a and the image processing part of the camera sensor 17b so as to receive the "radar sensor detection information" and the "camera sensor detection information". The target object recognition part 17c determines (obtains/acquires) the "target object information including the target object ID, the longitudinal distance Dfx(n), the lateral position Dfy(n), the relative speed Vfx(n), and the like" of the target object (n) which has been recognized, using at least one set of the "radar sensor detection information" and the "camera sensor detection information". The target object recognition part 17c transmits the determined target object information to the DSECU, every time a predetermined time elapses.

It should be noted that, when both of the "radar sensor detection information" and the "camera sensor detection information" on a certain target object (n) have been acquired/obtained, the target object recognition part 17c fuses (integrates) them to thereby determine (acquire/obtain) final target object information on the target object (n), as described below.

That is, as shown in FIG. 2, the target object recognition part 17c adopts the longitudinal distance Dfx included in the radar sensor detection information as a final longitudinal distance Dfx(n) of the target object (n). Meanwhile, the target object recognition part 17c determines a final lateral position Dfy(n) of the target object (n) through calculation (Dfy(n)="the longitudinal distance Dfx"×"tanθp"), based on "the longitudinal distance Dfx" included in the radar sensor detection information, and "the direction θp of the target object (n)" included in the camera sensor detection information. Furthermore, the target object recognition part 17c adopts the relative speed Vfx included in the radar sensor detection information as the final relative speed Vfx(n) of the target object (n). The target object recognition part 17c adopts the target object ID included in the radar sensor detection information as a final target object ID. It should be noted that the "target object information determined by using the detection results of both of the radar sensor 17a and the camera sensor 17b" as described above may be referred to as "two sensors detection target object information" in some cases.

Generally, a degree of accuracy in detecting the direction θp of the target object with respect to the own vehicle SV by the camera sensor 17b is higher than that by the radar sensor 17a. A degree of accuracy in detecting the longitudinal distance Dfx between the own vehicle SV and the target object by the radar sensor 17a is higher than that by the camera sensor 17b. Therefore, "the longitudinal distance Dfx(n) and the lateral position Dfy(n)" of the "two sensors detection target information" tend to be more accurate than "the longitudinal distance Dfx(n) and the lateral position Dfy(n)" (that is. "one sensor detection target object information" described later) detected by only one of the radar sensor 17a and the camera sensor 17b.

In contrast, when only one of the "radar sensor detection information" and the "camera sensor detection information" of the certain target object (n) is detected/acquired, the target object recognition part 17c acquires/obtains (determines) the final target object information of the target object (n) based only on the information which has been successfully detected, and transmits that final target object information to the DSECU, every time a predetermined time elapses. In this case, when only the radar sensor detection information has been detected/acquired, the target object ID is set to the target object ID included in the radar sensor detection information. In contrast, when only the camera sensor detection information has been detected/acquired, the target object recognition part 17c assigns/gives a "new target object ID which does not overlap the already-present target object ID" to "the target object recognized by the camera sensor detection information", and transmits this new target object ID to the DSECU. As described above, the target object information determined based on only one of "the radar sensor detection information" and "the camera sensor detection information" may be referred to as the "one sensor detection target object information" in some cases.

Furthermore, the image processing part of the camera sensor 17b recognizes/detects lane markers (hereinafter, also simply referred to as "while lines") such as left and right white lines on a road and the like, based on a pair of the right and left image data. In addition, the image processing part calculates a shape (for example, a curvature radius) of an "own vehicle traveling lane" which is a lane in which the own vehicle is traveling and a positional relationship between the own vehicle traveling lane and the own vehicle, every time a predetermined time elapses, to transmit those calculated shape and positional relationship to the DSECU. The positional relationship between the own vehicle traveling lane and the own vehicle is defined/represented by:

a distance in the lane width direction between "a center position (that is, the center line) between the left white line and the right white line of the own vehicle traveling lane" and "the center position of the own vehicle in the vehicle width direction";

an angle (that is, a yaw angle) formed by a direction of the center line and the x axis direction of the own vehicle, and the like, for example.

It should be noted that information such as the shape of the own vehicle traveling lane, and/or the positional relationship in the lane width direction may be given/acquired from the navigation ECU 90.

An operation switch 18 shown in FIG. 1 is a switch operated by a driver of the own vehicle. The driver can operate the operation switch 18 to select whether or not a lane keeping control including a following-travel steering control described later is to be performed. In addition, the driver can operate the operation switch 18 to select whether or not an inter-vehicle-distance control (following inter-vehicle-distance control) described later is to be performed.

A yaw rate sensor 19 is configured to detect a yaw rate of the own vehicle to output a signal indicative of the detected yaw rate (an actual yaw late YRt).

The engine ECU 30 is connected to an engine actuator 31. The engine actuator 31 is an actuator for changing an operation state of an internal combustion engine 32. The engine actuator 31 includes at least a throttle valve actuator for changing an opening degree of the throttle valve. The engine ECU 30 changes the torque generated by the internal combustion engine 32 by driving the engine actuator 31 so as to control a driving force of the own vehicle, to thereby be able to change an acceleration state (acceleration) of the own vehicle.

The brake ECU 40 is connected to a brake actuator 41. The brake actuator 41 is provided in a hydraulic pressure circuit provided between a master cylinder (not shown) and a friction brake mechanism 42 provided in right-and-left front-and-rear respective wheels. The brake actuator 41 adjusts, in response to an instruction from the brake ECU 40, a hydraulic pressure to be supplied to a wheel cylinder built in the brake caliper 42b of the friction brake mechanism 42 to press a brake pad onto a brake disk 42a using the hydraulic pressure so as to generate a friction braking force. Therefore, the brake ECU 40 controls the brake actuator 41 to control a braking force applied to the own vehicle, to thereby be able to change the acceleration of the own vehicle (in this case, a deceleration).

The steering ECU 60 is a control unit of a well-known electric power steering system and is connected to a motor driver 61. The motor driver 61 is connected to a steering motor 62. The steering motor 62 is incorporated into a "steering mechanism including a steering wheel SW, a steering shaft US, a gear mechanism (not shown) for steering, and the like". The steering motor 62 generates torque using electric power supplied from the motor driver 61, to thereby be able to generate a steering assist torque or steer the left-and-right steered wheels using the generated torque.

That is, the steering motor 62 can change a steering angle (also referred to as a "turning angle") of the own vehicle.

The meter ECU 70 is connected to a digital display meter (not shown). Furthermore, the meter ECU 70 is also connected to a hazard lamp(s) 71 and a stop lamp(s) 72 and can change lighting states of those lamps in response to instructions transmitted from the DSECU.

The alert ECU 80 is connected to a buzzer 81 and a display device 82. The alert ECU 80 can cause buzzer 81 to generate sounds to alert the driver in response to an instruction transmitted from the DSECU. In addition, the alert ECU 80 can cause the display device 82 to light (turn on) an attention/alert mark such as a warning lamp.

The navigation ECU 90 is connected to a GPS receiver 91 which receives a GPS detection signal for detecting a present position of the own vehicle, a map database 92 which stores a map information and the like, a touch-screen type display 93, and the like. The navigation ECU 90 identifies the present position of the own vehicle based on the GPS detection signal. When the own vehicle is traveling in a road including a plurality of lanes, the navigation ECU 90 can acquire/obtain information for identifying the lane in which the own vehicle is traveling currently. The navigation ECU 90 executes various calculation processes based on the present position of the own vehicle, the map information stored in the map database 92, and the like to perform a route guidance using the display 93 based on that calculation processing result.

<Outline of Operation>

Next, the outline of the operation of the present embodiment apparatus will be described. The DSECU of the present embodiment operates so as to properly set/specify the following-travel steering target vehicle while the following-travel steering control described later is being performed. The following-travel steering control is one type of the lane keeping controls, and is performed only while the inter-vehicle-distance control is being performed. Accordingly, first, the inter-vehicle-distance control and the lane keeping control will be described.

<Inter-Vehicle-Distance Control (ACC; Adaptive Cruise Control)>

The inter-vehicle-distance control (that is, the following-travel inter-vehicle-distance control) is a control for causing the own vehicle to follow a preceding vehicle which is present in the front area of the own vehicle and which travels immediately in front (ahead) of the own vehicle, while maintaining an inter-vehicle distance (that is, a longitudinal distance Dfx(n) of that preceding vehicle with respect to the own vehicle) between the preceding vehicle and the own vehicle at a predetermined target inter-vehicle distance. The following-travel inter-vehicle-distance control is well known (for example, refer to Japanese Patent Application Laid-Open No. 2014-148293, No. 2006-315491, Japanese Patent No. 4172434, and Japanese Patent No. 4929777). Therefore, the inter-vehicle-distance control (the following-travel inter-vehicle-distance control) will be described briefly.

The DSECU performs the inter-vehicle-distance control when the inter-vehicle-distance control is requested through the operation of the operation switch 18.

First, when the inter-vehicle-distance control is requested, the OSECU specifies a following target vehicle which the own vehicle should follows based on the target object information of the target object (n) obtained/detected by the surroundings monitoring sensor 17. Hereinafter, the following target vehicle which the own vehicle should follows is referred to as an "inter-vehicle-distance target vehicle".

More specifically, as will be described below, the DSECU determines (specifies) the inter-vehicle-distance target vehicle from among one or more of the other vehicles (that is, one or more of preceding vehicles) traveling in the front area of the own vehicle.

Step 1A: the OSECU acquires/obtains "the vehicle speed SPD of the own vehicle" from the vehicle speed sensor 16 and acquires/obtains "the yaw rate Yrt of the own vehicle" from the yaw rate sensor 19. "The vehicle speed SPD of the own vehicle and the yaw rate Yrt of the own vehicle" are motion state quantity of the own vehicle.

Step 2A: the DSECU predicts/extrapolates a traveling course in which the own vehicle will travel in the x-y coordinate system, based on the vehicle speed SPD and the yaw rate Yrt.

Step 3A: the OSECU determines (selects/sets) an other vehicle having an "absolute value of the distance in a lane width direction with respect to the predicted/extrapolated traveling course of the own vehicle" equal to or smaller than a first reference threshold, as an inter-vehicle-distance target vehicle (a). The DSECU selects/sets this other vehicle from among one or more of the other vehicles (that is, the one or more of the preceding vehicles) having a longitudinal distance Dfx(n) being a positive value. The first reference threshold is a value which becomes smaller as the longitudinal distance Dfx(n) becomes longer. It should be noted that the DSECU specifies/determines the other vehicle having a minimum value of the longitudinal distance Dfx(n) as the inter-vehicle-distance target vehicle (a), if there are a plurality of the other vehicles which have been determined (selected/set) in the manner as described above.

After specifying the inter-vehicle-distance target vehicle (a), the DSECU calculates a target acceleration Gtgt in accordance with one of the following Expression (1) and Expression (2). In Expression (1) and Expression (2), Vfx(a) is a relative speed of the inter-vehicle-distance target vehicle (a) with respect to the own vehicle, each of k1 and k2 is a predetermined positive gain (coefficient), and ΔD1 is an inter-vehicle deviation (ΔD1=Dfx(a)−Dtgt) obtained by subtracting a "target inter-vehicle-distance Dtgt" from "the longitudinal distance Dfx(a) of the inter-vehicle-distance target vehicle (a)". The target inter-vehicle-distance Dtgt is calculated by multiplying a target inter-vehicle time Ttgt by the vehicle speed SPD of the own vehicle (that is, Dtgt=Ttgt×SPD). The target inter-vehicle time Ttgt is set by the driver through the use of the operation switch 18.

The DSECU determines the target acceleration Gtgt in accordance with the following Expression (1) when the value (k1×ΔD1+k2×Vfx(a)) is positive or zero. ka1 in Expression (1) is a positive gain (coefficient) for accelerating the own vehicle and is set to a value equal to or smaller than "1". The DSECU determines the target acceleration Gtgt in accordance with the following Expression (2) when the value (k1×ΔD1+k2×Vfx(a)) is negative. kd1 Expression (2) is a positive gain (coefficient) for decelerating the own vehicle. In this example, kd1 is set to "1".

$$Gtgt(\text{for acceleration})=ka1\cdot(k1\cdot\Delta D1+k2\cdot Vfx(a)) \quad (1)$$

$$Gtgt(\text{for deceleration})=ka1\cdot(k1\cdot\Delta D1+k2\cdot Vfx(a)) \quad (2)$$

It should be noted that when the inter-vehicle-distance target vehicle is unable to be specified/determined due to absence of the preceding vehicle, the DSECU determines the target acceleration Gtgt based on a "target vehicle speed set by using the operation switch 18" and the "vehicle speed SPD" in such a manner that the vehicle speed SPD of the own vehicle becomes equal to the target vehicle speed.

The DSECU controls the engine actuators 31 by using the engine ECU 30, and if necessary, controls the brake actuator 41 by using the brake ECU 40 such that an acceleration of the own vehicle becomes equal to the target acceleration Gtgt.

<Lane Keeping Control>

The DSECU performs the lane keeping control only while the inter-vehicle-distance control is being performed. The DSECU performs the lane keeping control when the lane keeping control is requested through the operation of the operation switch 18. The lane keeping controls mainly includes a sectioned lane keeping control and the following-travel steering control.

The sectioned lane keeping control is a control for determining a target traveling line (or a target traveling course) based on the lane markers such as the white lines, the yellow lines, and the like, and for adjusting/changing the steering angle of the own vehicle in such a manner that the own vehicle travels along that traveling target line. The sectioned lane keeping control may be referred to as "an LTC or a Lane Trace Control" in some cases. Hereinafter, the lane marker is expressed as the "white line" for convenience.

The following-travel steering control is a control for specifying one of the preceding vehicles as the following-travel steering target vehicle, and for adjusting/changing the steering angle of the own vehicle in such a manner that the own vehicle travels along the target traveling line determined in accordance with a traveling trajectory of that specified following-travel steering target vehicle. The following-travel steering control and the sectioned lane keeping control may be also collectively referred to as "a TJA or a Traffic Jam Assist" in some cases. The following-travel steering control and the sectioned lane keeping control may be also collectively referred to as a "steering support control", because those controls are controls for supporting a steering operation of the driver. Hereinafter, description will be made in the order of the sectioned lane keeping control and the following-travel steering control.

«Sectioned Lane Keeping Control»

When at least any one of the left white line and the right white line is recognized by the camera sensor 17b over a predetermined distance in a forward direction of the own vehicle SV (i.e., in the x-axis direction), the DSECU sets/determines the target traveling line Ld based on at least one of the left white line and the right white line which has been recognized.

More specifically, when both of the left white line and the right white line have been recognized over the predetermined distance in the forward direction of the own vehicle SV, the DSECU sets/determines a line (a center line) passing through midpoints in a lane width direction between the left white line and the right white line, as the target traveling line Ld.

In contrast, when only one of the left white line and the right white line has been recognized over the predetermined distance in the forward direction of the own vehicle SV, the DSECU extrapolates/determines a position of the unrecognized white line (the other white line) based on the one recognized white line and a lane width which was obtained at a time point at which both of the left white line and the right white line were recognized. Then, the DSECU sets/determines the center line passing the midpoints between the one recognized white line and the other white line which is extrapolated, as the target traveling line Ld.

Furthermore, the DSECU applies the steering torque to the steering mechanism by using the steering motor 62 to change the steering angle of the own vehicle in such a manner that the lateral position of the own vehicle (i.e., the position of the own vehicle with respect to the own vehicle traveling lane) is maintained in the vicinity of the target traveling line Ld, to thereby support a steering operation of the driver (for example, refer to Japanese Patent Application Laid-Open No. 2008-195402, No. 2009-190464, No. 2010-6279, and Japanese Patent No. 4349210). It should be noted that the steering control method will be described later in more detail «Following-Travel Steering Control»

When there is no white line recognized over the predetermined distance in the forward direction of the own vehicle SV, the DSECU selects the preceding vehicle suitable/appropriate for the following-travel steering target vehicle from among one or more of the other vehicles (the preceding vehicles) which travel in the front area of the own vehicle (as the following-travel steering target vehicle). The DSECU generates/produces a traveling trajectory (hereinafter, also referred to as a "preceding vehicle trajectory") of the following-travel steering target vehicle. The DSECU applies the steering torque to the steering mechanism so as to change the steering angle in such a manner that the own vehicle travels along (in accordance with) a target traveling line determined/set based on that preceding vehicle trajectory. In this example, the DSECU sets the preceding vehicle trajectory itself as the target traveling line Ld. It should be noted that the DSECU may set the target traveling line Ld to a line shifted in the lane width direction from the preceding vehicle trajectory by a predetermined distance.

Next, a method for determining the following-travel steering target vehicle, a method for producing/generating the preceding vehicle trajectory, and a method of the following-travel steering control will be described in more detail.

1. Method for Determining the Following-Travel Steering Target Vehicle

The DSECU determines the following-travel steering target vehicle based on the "target object information of the target object (n)" obtained by the surroundings monitoring sensor 17. More specifically, the DSECU determines (specifies) the following-travel steering target vehicle based on a behavior of the own vehicle and the target object information on the preceding vehicle, according to procedures/steps described below.

Step 1B: the DSECU acquires/obtains "the vehicle speed SPD of the own vehicle and the yaw rate Yrt of the own vehicle" which represent the motion state quantity of the own vehicle from the vehicle speed sensor 16 and the yaw rate sensor 19, respectively.

Step 2B: the DSECU predicts/extrapolates the traveling course in which the own vehicle will travel on the x-y coordinate system, based on the vehicle speed SPD and the yaw rate Yrt.

Step 3B: The DSECU determines (selects/sets), as a candidate of the following-travel steering target vehicle, the other vehicle having "an absolute value of the distance in a lane width direction with respect to the extrapolated traveling course of the own vehicle" which is equal to or smaller than a predetermined second reference threshold, Note that the DSECU selects the candidate of the following-travel steering target vehicle from among the other vehicle(s) (that is, the preceding vehicle(s)) having the longitudinal distance Dfx(n) being a positive value. The candidate of the following-travel steering target vehicle is simply referred to as a "target candidate vehicle". The second reference threshold is set so as to decrease as the longitudinal distance Dfx(n) increases. That is, the DSECU determines/regards, as the target candidate vehicle, the preceding vehicle which is present along the traveling course (or in an area having at least a vehicle width of the own vehicle along the traveling course of the own vehicle). If there are a plurality of the other vehicles which can be determined/specified as the target candidate vehicles, the DSECU determines/specifies, as the target candidate vehicle, the other vehicle which has a minimum value of "the absolute of the distance in the lane width direction with respect to the extrapolated traveling course of the own vehicle". The second reference threshold may be the same as or be different from the above-described first reference threshold.

The OSECU makes a determination as to whether or not the target candidate vehicle is appropriate/suitable for the following-travel steering target vehicle (b), as described later. Then, the DSECU determines the target candidate vehicle which has been determined to be appropriate/suitable for the following-travel steering target vehicle as the following-travel target vehicle, and stores the target object ID (hereinafter, is also referred to as a "target vehicle ID") assigned/given to that target candidate vehicle, as a target object ID of the following-travel steering target vehicle (b), in the RAM.

2. Generating/Producing for Preceding Vehicle Trajectory

Figure 3:
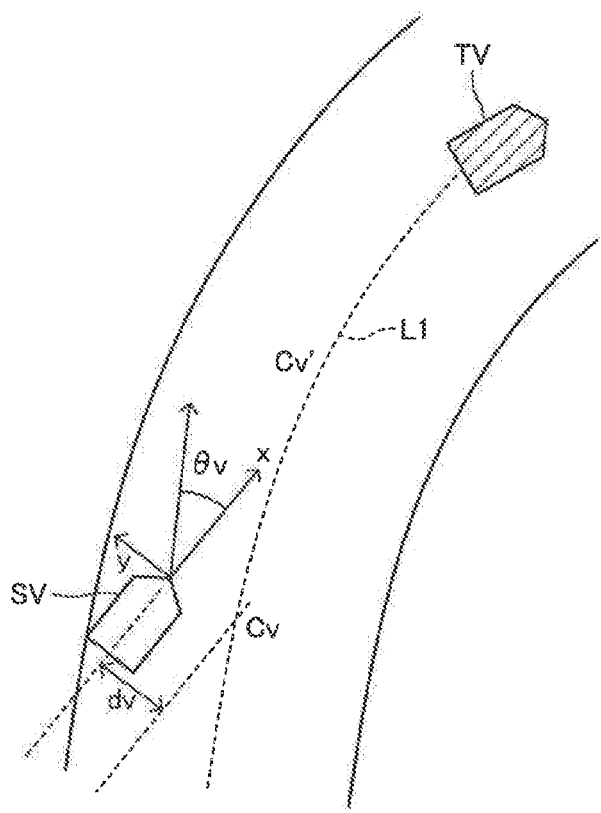
FIG. 3 is a plan view for illustrating the lane keeping control.
Figure 4:
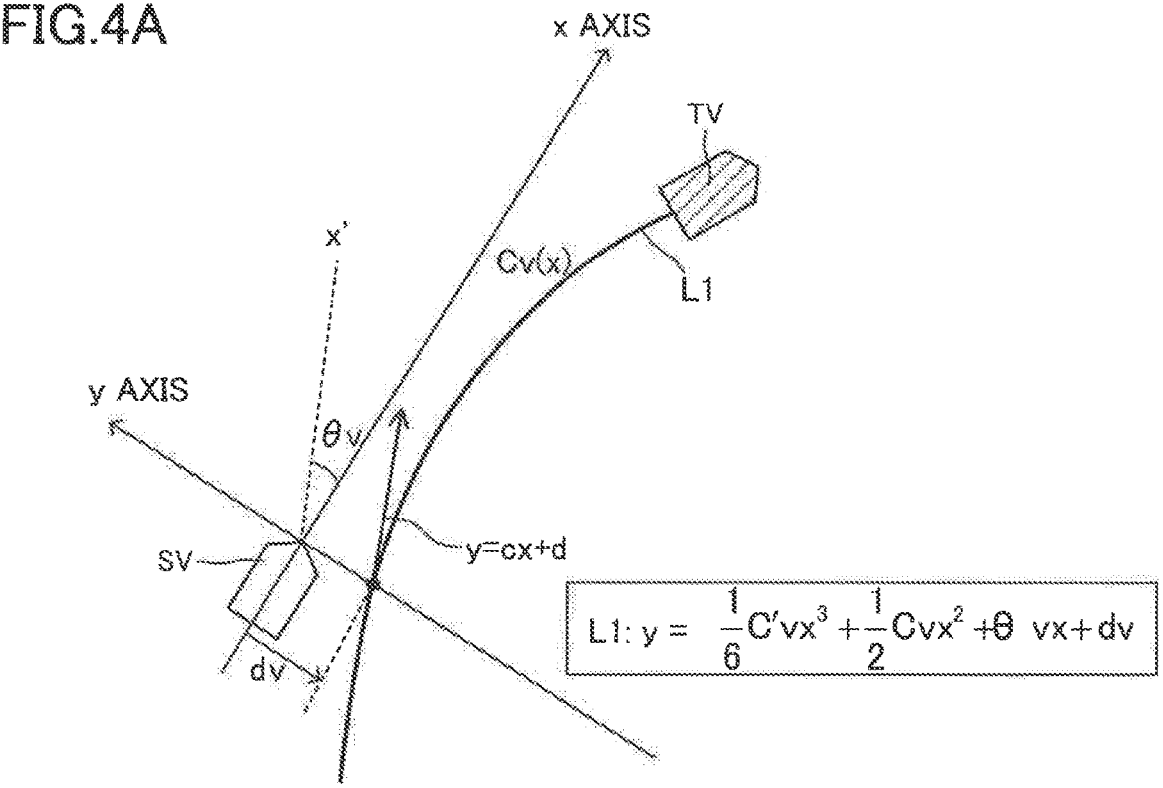

As shown in FIG. 3, the DSECU produces/generates a traveling trajectory L1 of the following-travel steering target vehicle TV (that is, the preceding vehicle trajectory L1): More specifically, as shown in FIG. 4A, it is known that the traveling trajectory L1 is approximated accurately with a curve line represented by a cubic function of the following Expression (3) in the above-described x-y coordinate system defined based on a present position of the own vehicle at a present time point.

$$y=(1/6)Cv'\cdot x^3+(1/2)Cv\cdot x^2+\theta v\cdot x+dv \quad (3)$$

Cv': Cv' is a curvature change rate (curvature change amount per unit distance ($\Delta x$) at an arbitrary position (x=x0, x0 is an arbitrary value) on the curve) of a curvature of the traveling trajectory of the following-travel steering target vehicle TV.

Cv: Cv is the curvature of the traveling trajectory L1 of the following-travel steering target vehicle TV when the following-travel steering target vehicle TV was present at the present position (x=0) of the own vehicle SV (that is, when the following-travel steering target vehicle TV was present at the position of (x=0, y=dv)).

θv: θv is an angle deviation between a "direction (a tangential direction of the traveling trajectory L1) of the traveling trajectory L1 when the following-travel steering target vehicle TV was present at the present position (x=0) of the own vehicle SV" and the "traveling direction ("+" direction of the x-axis) of the own vehicle SV". The θv is also referred to as the "yaw angle".

dv: dv is a distance dv in the y axis direction (substantially, in the lane width direction) between the present position (x=0, y=0) of the own vehicle SV and the traveling trajectory L1. This distance dv is also referred to as a "center distance".

The above-described Expression (3) is derived as follows. That is, as shown in FIG. 4B, the traveling trajectory L1 is defined by (or expressed as) the cubic function f(x)=ax³+bx²+cx+d. Using expressions and conditions shown in FIG. 4B, the relationships shown in FIG. 4C (that is, "the relationship between the coefficients (a, b, c and d) of the cubic function f(x), the curvature, and the like") are derived. Therefore, the OSECU calculates the coefficients (a, b, c, and d) of the cubic function f(x) based on the relationship shown in FIG. 4C, to thereby derive the above-described Expression (3).

Based on the above viewpoint, the DSECU calculates the coefficients (in other words, coefficients a, b, c, and d of the function f(x)) of the first to fourth terms on the right side of Expression (3) as follows.

The DSECU acquires/obtains the target object information on the following-travel steering target vehicle TV (hereinafter, referred to as a "target object (b)" in some cases) to store (buffer) position coordinate data at a time point at which the DSECU has acquired that target object information in the RAM, every time a predetermined measurement time elapses. The position coordinate data is indicative of a position (the longitudinal distance Dfx(n) and the lateral position Dfy(n)) of the following-travel steering target vehicle TV at the time point at which the DSECU has acquired/obtained that target object information. It should be noted in order to minimize data to be stored in the RAM, the OSECU may store only a limited number of "relatively new position coordinate data sets of the following-travel steering target vehicle TV" that have been acquired within a certain period up to the present time point and which includes the latest position coordinate data set, and discard the position coordinate data sets older than the data sets acquired within that certain period.

The DSECU converts the position coordinate data of the following-travel steering target vehicle TV stored in the RAM into the position coordinate data on the x-y coordinate system having the present position of the own vehicle SV at the present time point as the origin (x=0, y=0). This converting process is executed based on a difference between "the position and the traveling direction of the own vehicle SV" at the time point at which the DSECU acquired the position coordinate data and "the position and the traveling direction of the own vehicle SV" at the present time point. In the following description, an x coordinate of this converted position coordinate data is represented by (expressed as) "xi" and a y coordinate of this converted position coordinate is represented by (expressed as) "yi". The xi and the yi may be referred to as "converted position coordinates" in some cases. In this case, (xi, yi)=(x1, y1), (x2, y2), (x3,y3), (x4,y4), (x5,y5), (x6,y6) are examples of the converted position coordinates of the following-travel steering target vehicle TV which has been acquired in the manner as described above.

The DSECU executes a curve fitting process with the use of the converted position coordinates of the following-travel steering target vehicle TV to produce/generate the traveling trajectory L1 of the following-travel steering target vehicle TV. The curve used in this curve fitting process is a cubic curve (for example, the cubic curve represented by the above-described cubic function f(x)). The curve fitting process is executed by a weighted least squares method. That is, the DSECU determines coefficients a, b, c, and d in such a manner that "sum of squares of deviation ydif_all weighted by weight gi" represented by Expression (4) is minimized.

$$\text{ydif\_all} = \sum_{i=1}^{n} gi(yi - f(xi))^2 \qquad (4)$$

In this time, when the term "gi·(yi−f(xi))²" is a term obtained by substituting the converted position coordinates (xi, yi) acquired/obtained based on the "one sensor detection target object information for the term "gi·(yi−f(xi))²", the DSECU sets the weight gi to a first value (for example, gi=0.1) which is a relatively small value. In contrast, when the term "gi·(yi−f(xi))²" is a term obtained by substituting the converted position coordinates (xi, yi) acquired/obtained based on the "two sensors detection target object information for the term "gi·(yi−f(xi))²", the DSECU sets the weight gi to "a second value (for example, gi=1) which is greater than the first value".

Figure 5:
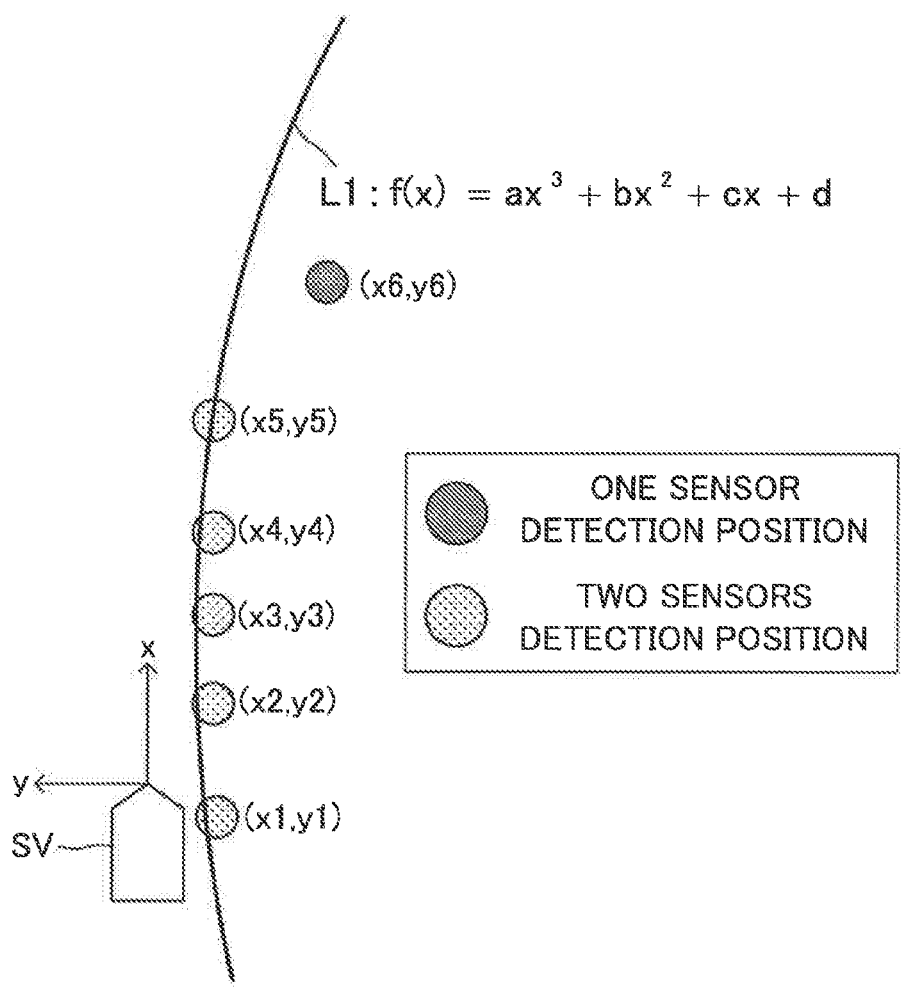
FIG. 5 is a plan view for illustrating a generation of a traveling trajectory.

For example, in an example of FIG. 5, the DSECU sets the weight g6 of the term "g6·(y6−f(x6))²" obtained by substituting the converted position coordinates (xi, yi)=(x6, y6) acquired/obtained based on the "one sensor detection target object information for the term "gi·(yi−f(xi))²" to the first value. The DSECU sets each of the weights g1 to g5 of the terms "g1·(y1−f(x1))²" to "g5 (y5−f(x5))²" obtained by substituting the converted position coordinates (xi, yi)=(x1, y1) to (x5, y5) acquired/obtained based on the "two sensors detection target object information for the term "gi (yi−f (xi))²" to the second value. As a result, the "one sensor detection target object information" which is highly likely to have low degree of detection accuracy is harder to be reflected in (affect) the produced/generated traveling trajectory L1, as compared with the "two sensors detection target information". Therefore, the DSECU can produce/generate the traveling trajectory L1 with higher degree of accuracy.

3. Performing of Following-Travel Steering Control

The DSECU sets the target traveling line Ld to the thus produced/generated traveling trajectory L1. Furthermore, the DSECU acquires/obtains information (hereinafter, referred to as "target traveling course information" in some cases) necessary for the following-travel steering control which is performed in accordance with the traveling trajectory L1 set as the target traveling line, based on the coefficients of the cubic function of Expression (3) and Expression (the relational expression) shown in FIG. 4C. The target traveling course information includes the curvature Cv of the traveling trajectory L1, the yaw angle θv with respect to the traveling trajectory L1, the center distance dv with respect to the traveling trajectory L1, and the like.

The DSECU calculates a target steering angle θ* by applying the curvature Cv, the yaw angle θv, and the center distance dv to the following Expression (5), every time a predetermined time elapses. In Expression (5), each of Klta1 Klta2, and Klta3 is a control gain determined in advance. Furthermore, the DSECU controls the steering motor 62 by using the steering ECU 60 in such a manner that the actual steering angle θ becomes equal to (coincides with) the target steering angle θ*. In this manner, the steering control through the following-travel steering control is performed.

$$\theta^* = Klta1 \cdot Cv + Klta2 \cdot \theta v + Klta3 \cdot dv \qquad (5)$$

It should be noted that the DSECU may calculate a target yaw rate YRc* through applying the curvature Cv, the yaw angle θv, and the center distance dv to the following Expression (6) every time the predetermined time elapses. In this case, the DSECU calculates a target steering torque Tr* for obtaining the target yaw rate YRc* with the use of a lookup table, based on the target yaw rate YRc* and the actual yaw rate YRt. Then, the DSECU controls the steering motor 62 by using the steering ECU 60 in such a manner that the actual steering torque Tra becomes equal to the target steering torque Tr*. In this manner as well, the steering control through the following-travel steering control is also performed. As understood from the above, as long as the DSECU can acquire/obtain the target traveling course information, the DSECU can perform the following-travel steering control in which the traveling trajectory L1 is set as the target traveling line Ld without calculating the target traveling line Ld itself.

$$YRc^* = K1 \times dv + K2 \times \theta v + K3 \times Cv \quad (6)$$

The DSECU also uses the above-described Expression (5) or Expression (6), when the DSECU performs the above-described sectioned lane keeping control as well. More specifically, the DSECU calculates a curvature CL of the target traveling line Ld (that is, the center line of the own vehicle traveling lane) which has been set based on at least one of the left white line and the right white line, a distance dL in the y axis direction (substantially, the road width direction) between the center position in the vehicle width direction of the own vehicle and the target traveling line Ld, and a deviation angle θL (a yaw angle θL) formed between a direction (a tangential direction) of the target traveling line Ld and the traveling direction of the own vehicle SV.

Then, the DSECU replaces dv with dL, and replaces Cv with CL, in Expression (5) (or Expression (6)), to thereby calculate the target steering angle θ*. The DSECU controls the steering motor 62 in such a manner that the actual steering angle θ becomes equal to that target steering angle θ*. In this manner, the steering control by the sectioned lane keeping control is performed.

When the DSECU is unable to set the target traveling line Ld based on at least one of the left white line and the right white line and the DSECU is unable to produce/generate the preceding vehicle trajectory (including a case where the DSECU is unable to determine the following-travel steering target vehicle), the DSECU cancels performing the lane keeping control. That is, in this case, the DSECU does not perform the lane keeping control. The above descriptions are about the outline of the lane keeping control.

«Operation Performed when the Other Vehicle Approaches the Following-Travel Steering Target Vehicle»

Figure 6C:
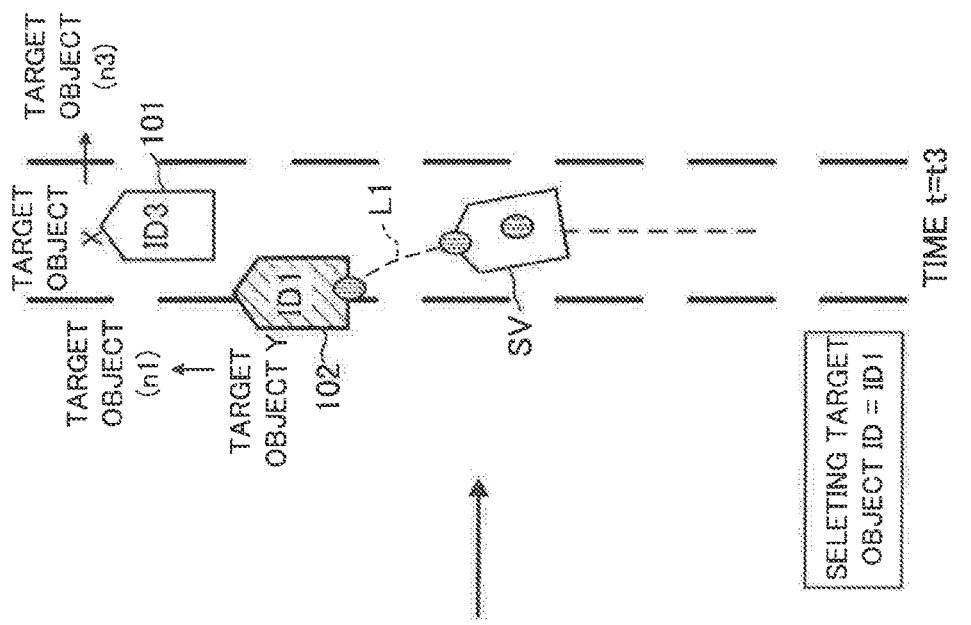
FIG. 6C is a plan view showing a road and a vehicle for illustrating an operation of the vehicle driving support apparatus according to the embodiment of the present invention.
Figure 6B:
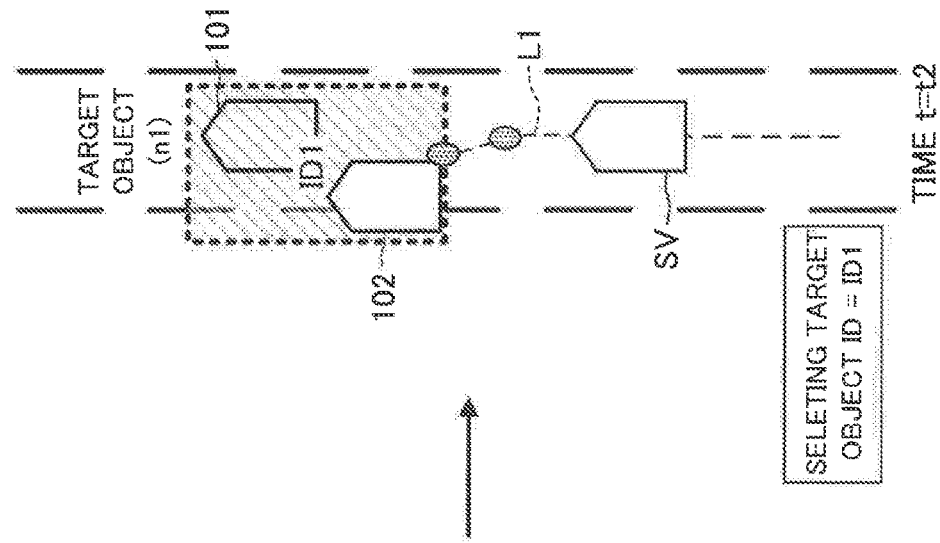
FIG. 6B is a plan view showing a road and a vehicle for illustrating an operation of the vehicle driving support apparatus according to the embodiment of the present invention.
Figure 6A:
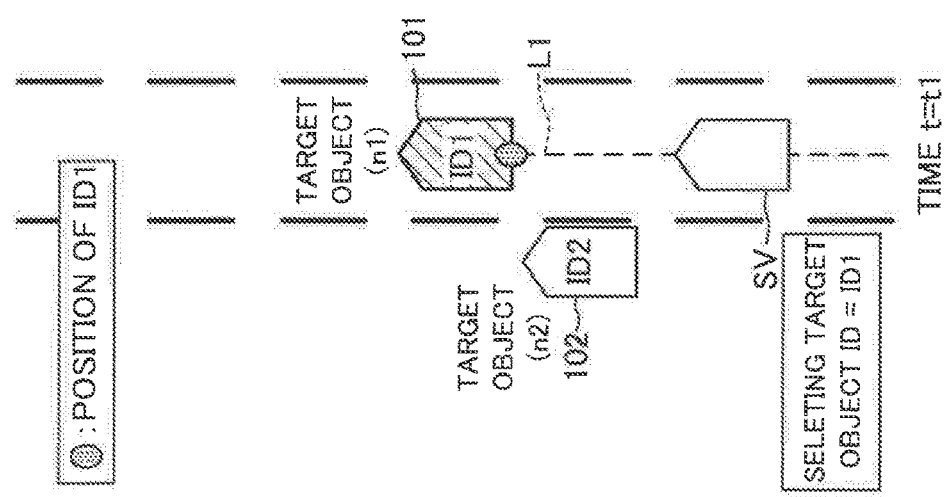
FIG. 6A is a plan view showing a road and a vehicle for illustrating an operation of the vehicle driving support apparatus according to the embodiment of the present invention.

As shown in FIG. 6A, at the time t1 a case may occur where a second vehicle 102 is about to cut in between the own vehicle SV and the first vehicle 101, while the following-travel steering control is being performed using the traveling trajectory L1 of "the first vehicle 101 which has been specified (determined) as the following-travel steering target vehicle" as the target traveling line. It should be noted that, in this example, the surroundings monitoring sensor 17 has been detecting the first vehicle 101 as the target object (n1) and has been assigning "ID1" to the target object (n1) as the target object ID of that target object (n1). In addition, at the time t1, the surroundings monitoring sensor 17 has detected the second vehicle 102 as the target object (n2) and has assigned "ID2" to the target object (n2) as the target object ID of the target object (n2).

Next, as shown in FIG. 6B, a case may occur where the second vehicle 102 further approaches the first vehicle 101 at the time 2 at which a certain time has elapsed since the time t1.

When this case happens, the first vehicle 101 and the second vehicle 102 are excessively close to each other, and thus, the surroundings monitoring sensor 17 may detect (erroneously detect) "the first vehicle 101 and the second vehicle 102" as a single target object (one target object), due to the reason described later. That is, the surroundings monitoring sensor 17 may erroneously detect "the first vehicle 101 and the second vehicle 102" as the target object (n1) recognized at the time t1. In this case, the surroundings monitoring sensor 17 maintains the target object ID of the target object (n1) at "ID1".

The erroneous detections/recognition as described above tends to occur when the target object is detected through the use of the radar sensor 17a only (i.e., without using the camera sensor 17b). The reason is as follows. There may be a case where the radar sensor 17a is unable to detect a single target object only from reflection point information based on the millimeter wave regarding the second vehicle 102. In this case, if the reflection point included in the reflection point information is present in the vicinity of another reflection point regarding the first vehicle 101, the radar sensor 17a tends to recognize that "these detected reflection points" are obtained from a single target object, and thus, tends to group/integrate/fuse these detected reflection points. Especially, this type of erroneous detections/recognition tends to occur when a difference between the speed of the first vehicle 101 and the speed of the second vehicle 102 is small.

Even after the surroundings monitoring sensor 17 recognizes/regards the first vehicle 101 and the second vehicle 102 as the single target object (n1), the DSECU continues determining that the target object (n1) is the following-travel steering target vehicle as long as that target object (n1) is present on/along the traveling course of the own vehicle SV. In other words, the DSECU recognizes/regards the target object (=the target object (n1)) having the target object ID="ID1", as the following-travel steering target vehicle, and performs the following-travel steering control based on the traveling trajectory L1 of the recognized following-travel steering target vehicle.

Thereafter, as shown in FIG. 6C, at the time t3 at which a certain time has elapsed since the time t2, the second vehicle 102 moves away from the first vehicle 101 in the road width direction. In this case, the surroundings monitoring sensor 17 may recognize the first vehicle 101 and the second vehicle 102 as two target objects distinct/independent from each other.

When the above situation occurs, the target object ID (that is, "ID1") of the target object (n1) at the time t2 may erroneously handed over to the second vehicle 102 instead of the first vehicle 101. In this case, the target object ID (that is, "ID1") which was assigned/given to the first vehicle 101 at the time t1 is unfavorably handed over (assigned) to the second vehicle 102 at and after the time t3.

That is, the surroundings monitoring sensor 17 recognizes/regards the first vehicle 101 as the single target object (for convenience, referred to as a "target object X") and recognizes/regards the second vehicle 102 as another target object (for convenience, referred to as a "target object Y") different from the target object X, at the time t3.

The surroundings monitoring sensor 17 hands over (assigns) the target object ID (that is, "ID1") of the target object (n1) to a "high probability target object", and assigns a new target object ID (for example, "ID3") to the other target object among the target objects X and Y. The high probability target object is one of the target objects (either the target object X or the target object Y) which is determined by the surroundings monitoring sensor 17 to be more likely to be the same as the target object which was recognized as the target object (n1) at the time t2 than the other target object. For example, the high probability target object is the target object, among the target object X and the target object Y, whose position is closer to a position extrapolated based on "the position and the relative speed" of the target object recognized/regarded as the target object (n1) at the time t2.

Accordingly, if the target object Y is the high probability target object, the surroundings monitoring sensor 17 assigns/ gives "ID1" to the target object Y, and assigns/gives a new target object ID (for example, "ID3") to the target object X.

Furthermore, if the second vehicle 102 (the target object Y) is present on/along the traveling course of the own vehicle SV at the time t3, the DSECU determines/regards the "second vehicle 102 (the target object Y) to which "ID1" as the target object ID is assigned/given" as "the following-travel target vehicle". In this case, the target object ID of the target object which the DSECU has been recognizing/regarding as the following-travel steering target vehicle remains "ID1" in a period from the time t1 to a time point after the time t3. The DSECU is unable to recognize that the following-travel steering target vehicle has changed from the first vehicle 101 to the second vehicle 102 at the time t3.

As a result, the DSECU produces/generates the traveling trajectory L1 based on first target object information described below and second target object information described below, and determines the produced/generated traveling trajectory as the target traveling line (i.e., sets the target traveling line to the produced/generated traveling trajectory).

The first target object information is "the target object information of the target object having "ID1" as the target object ID" which had been acquired/obtained immediately before the time t3. The target object having "ID1" is either the first vehicle 101 or the target object recognized/regarded as the single target object actually including the first vehicle 101 and the second vehicle 102.

The second target object information is "the target object information of the target object (the second vehicle 102) having "ID1" as the target object ID" which is acquired/obtained after the time t3.

Therefore, this traveling trajectory L1 (i.e., the target traveling line) becomes a trajectory greatly affected by a movement of the second vehicle 102 in the road width direction, and thus, greatly differs/deviates from a traveling trajectory of the appropriate (correct/proper) following-travel steering target vehicle (i.e., the first vehicle 101).

For this reason, the traveling trajectory L1 (that is, the target traveling line) on and after the time t3 curves toward a position of the second vehicle 102, and therefore, is deformed in the lateral direction from the center position of the own vehicle traveling lane toward an end position of the own vehicle traveling lane. As a result, the own vehicle SV may be unable to continue stably traveling along the own vehicle traveling lane. As understood, if the above-described situation occurs, the following-travel steering control with a low degree of accuracy may be performed.

In view of the above, the DSECU of the present embodiment apparatus is configured to carry out the following processes (1) to (3), in order to reduce "the possibility that the following-travel steering control with a low degree of accuracy is performed" even when the above-described situation occurs.

The process (1): first, the DSECU determines/specifies the target candidate vehicle in accordance with the above-described "method (that is, the steps 1B to 3B) for determining the target candidate vehicle".

The process (2): thereafter, the DSECU determines/regards the target candidate vehicle as the following-travel steering target vehicle, when the following-travel target vehicle has not been determined/specified at a time point at which that target candidate vehicle has been determined/specified (in other words, when the following-travel steering control is not being performed, and thus, the following-travel steering target vehicle has not been present). In this case, the DSECU acquires/obtains the target object ID of that target candidate vehicle as the target object ID of the following-travel steering target vehicle so as to store this target object ID in the RAM. It should be noted that the following-travel steering target vehicle which has been present is referred to as an "already-present target vehicle".

The process (3): in contrast, the DSECU determines whether or not the target object ID of the target candidate vehicle is the same as the target object ID of the already-present target vehicle, when the following-travel steering target vehicle has been determined since a time point before the target candidate vehicle is determined/specified (in other words, when the already-present target vehicle is present so that the following-travel steering control is being performed). The process (3) is followed by either a process (3A) or a process (3B) depending on the result of this determination.

The process (3A): when the target object ID of the target candidate vehicle and the target object ID of the already-present target vehicle are different from each other, the DSECU determines/regards the target candidate vehicle as a new following-travel steering target vehicle. That is, the DSECU acquires/obtains the target object ID of the target candidate vehicle as the target object ID of the following-travel target vehicle so as to store the obtained target object ID of the target candidate vehicle in the RAM.

The process (3B): when the target object ID of the target candidate vehicle and the target object ID of the already-present target vehicle are the same as each other, the DSECU determines whether or not a "condition of erroneously handing over target object ID" is satisfied. Hereinafter, the "condition of erroneously handing over target object ID" is simply referred to as a "specific condition". When the specific condition is satisfied, it can be determined that "the target candidate vehicle" is highly likely to be a preceding vehicle to which "the target object ID which had been assigned/given to the correct/proper following-travel steering target vehicle" has been erroneously handed over.

Figure 7:
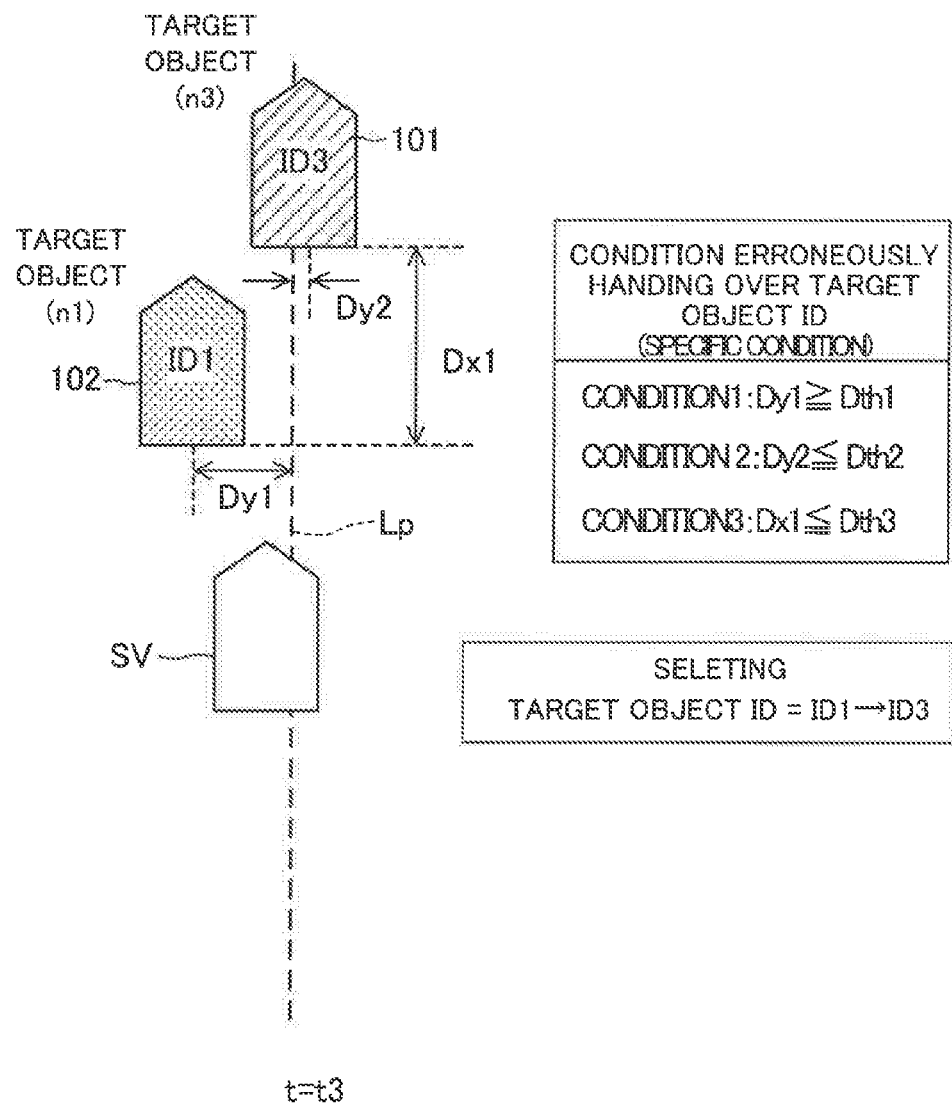
FIG. 7 is a plan view showing a road and a vehicle for illustrating the operation of the vehicle driving support apparatus according to the embodiment of the present invention.

The specific condition is satisfied when all of conditions 1 to 3 which will be described below are satisfied (refer to FIG. 7). It should be noted that FIG. 7 shows the same situation as the situation at the time t3 shown in FIG. 6C. That is, in the example shown in FIG. 7, the target object ID (that is, "ID1") of the first vehicle 101 assigned to the first vehicle 101 at the time t1 shown in FIG. 6A has been erroneously handed over to the second vehicle 102.

《Specific Condition (Condition of Erroneously Handing over Target Object ID)》

The condition 1: the condition 1 is a condition satisfied when a first distance Dy1 is equal to or greater than a first predetermined distance Dth1. The first distance Dy1 is a distance in the road width direction between "the target candidate vehicle (for example, the second vehicle 102 which is the target object (n1))" and "an already-present traveling trajectory Lp which is the traveling trajectory that has been produced/generated up to the present time point". In other words, the condition 1 is satisfied when the target candidate vehicle is traveling outside of "a predetermined area (for convenience, also referred to as a "first predetermined area") having a predetermined first distance in the lane width direction from the traveling trajectory of the already-present following-travel steering target vehicle".

The condition 2: the condition 2 is a condition satisfied when an other preceding vehicle which is different from the target candidate vehicle is present on/along the already-present traveling trajectory Lp. For example, the condition 2 is satisfied when the first vehicle 101 which is the target object (n3) different from the second vehicle 102 which is the target object (n1) is present on/along the already-present traveling trajectory Lp. More specifically, the condition 2 is a condition satisfied when the other preceding vehicle (e.g., the first vehicle 101) different from the target candidate vehicle is present and when a second distance Dy2 in the lane width direction between the other preceding vehicle and the already-present traveling trajectory Lp is equal to or smaller than a second predetermined distance Dth2. In other words, the condition 2 is satisfied when there is "the other vehicle" which is different from the target candidate vehicle and which is traveling within a predetermined area (for convenience, also referred to as a "second predetermined area") having a predetermined second distance in the lane width direction from the traveling trajectory of the already-present following-travel steering target vehicle. This "other vehicle" is also referred to as a "vehicle-on-trajectory".

The condition 3: the condition 3 is a condition satisfied when a third distance Dx1 (=|Dfx(n1)−Dfx(n3)|) is equal to or smaller than a third predetermined distance Dth3. The third distance Dx1 is a magnitude of a difference between the longitudinal distance Dfx(n1) of the target candidate vehicle (e.g., the second vehicle 102) and the longitudinal distance Dfx (n3) of the vehicle-on-trajectory (e.g., the first vehicle 101). In other words, the condition 3 is satisfied when the target candidate vehicle and the other vehicle (vehicle-on-trajectory) which is present on/along the already-present traveling trajectory Lp are close to each other in the direction of the longitudinal distance (i.e., the vehicle-on-trajectory is present in the vicinity of the target candidate vehicle in the longitudinal direction). The process (3B) is followed by either a process (3B1) or a process (3B2) depending on the result of the determination of whether the specific condition is satisfied.

The process (3B1): when the specific condition is satisfied, "the target candidate vehicle (e.g., the second vehicle 102)" is highly likely to be a vehicle having "the target object ID which has been erroneously handed over (assigned)", In other words, it is highly likely that the target candidate vehicle is not a correct/proper following-travel steering target vehicle. Furthermore, in this case, the vehicle-on-trajectory (e.g., the first vehicle 101) is highly likely to be the correct/proper following-travel steering target vehicle.

Therefore, when the specific condition is satisfied, the DSECU determines that the vehicle-on-trajectory (in this example, the first vehicle 101) is the following-travel steering target vehicle without determining that the target candidate vehicle is the following-travel steering target vehicle. Then, the DSECU acquires/obtains the target object ID (for example, "ID3") of the vehicle-on-trajectory as the target object ID of the following-travel steering target vehicle so as to store that obtained target object ID in the RAM as the target object ID of the following-travel steering target vehicle.

Therefore, even when the target object ID is erroneously handed over from the first vehicle 101 to the second vehicle 102, the possibility can be reduced/decreased that the second vehicle 102 is erroneously set as the following-travel steering target vehicle. Accordingly, the possibility can be reduced/decreased that "the following-travel steering control with a low degree of accuracy (i.e., the degraded steering support control) that causes the own vehicle SV to erroneously move toward the second vehicle 102" is performed.

The process (3B2): when the specific condition is not satisfied, it is likely that "the target candidate vehicle (the second vehicle 102)" is not a vehicle having "the target object ID which has been erroneously handed over (assigned)". In other words, the target candidate vehicle is highly likely to be the preceding vehicle appropriate/suitable for the following-travel steering target vehicle.

Therefore, when the specific condition is not satisfied, the DSECU determines that the target candidate vehicle is the following-travel steering target vehicle, and acquires/obtains "the target object ID (for example, "ID1") of that target candidate vehicle" as "the target object ID of the following-travel steering target vehicle" so as to store that obtained target object ID in the RAM as "the target object ID of the following-travel steering target vehicle".

«Specific Operation»

Next, specific operations of the CPU (hereinafter, simply referred to as a "CPU" in some cases) of the DSECU will be described. The CPU is configured to execute a routine (a following-travel steering control routine) shown by a flowchart in FIG. 8, every time a predetermined time elapses. It should be noted that the CPU is configured to perform the inter-vehicle-distance control (the ACC) according to an unillustrated routine. The CPU executes the routine shown in FIG. 8 only when the inter-vehicle-distance control is being performed.

Figure 8:
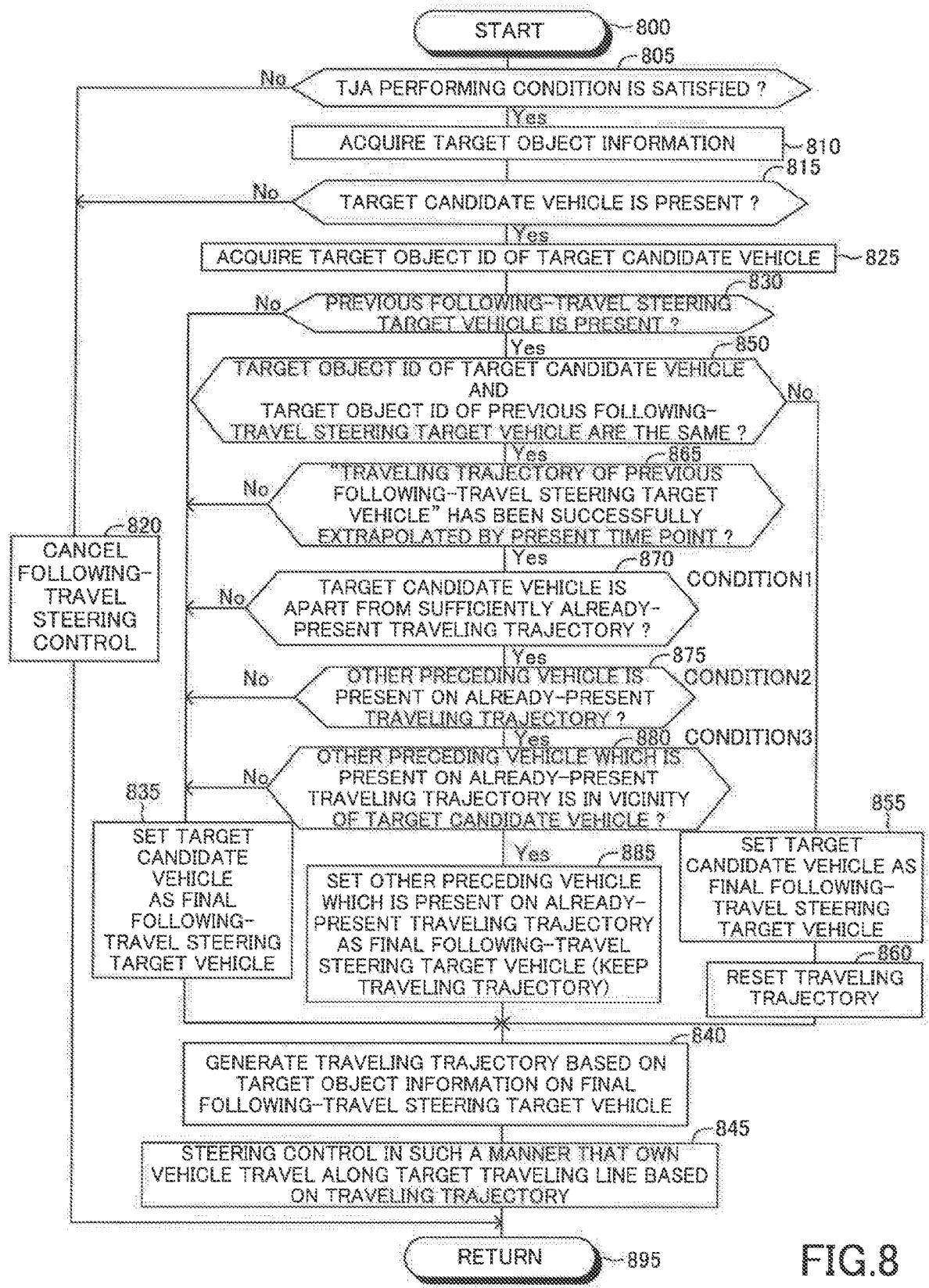
FIG. 8 is a flowchart showing a routine executed by the CPU of the driving support ECU provided on the vehicle driving support apparatus according to the embodiment of the present invention.

Therefore, when a predetermined time arrives while the inter-vehicle-distance control is being performed, the CPU starts processing from step 800 shown in FIG. 8 and proceeds to step 805 to determine whether or not a performing condition of the following-travel steering control (TJA) is satisfied. Hereinafter, the performing condition of the following-travel steering control (TJA) is referred to as a "TJA performing condition".

The TJA performing condition is satisfied when all of the following conditions (conditions C1 to C3) are satisfied, for example.

The condition C1 is a condition satisfied when performing the lane keeping control is being selected through the operation of the operation switch 18.

The condition C2 is a condition satisfied when the vehicle speed SPD is equal to or greater/higher than a predetermined lower limit vehicle speed and is equal to or smaller/lower than a predetermined upper limit vehicle speed.

The condition C3 is a condition satisfied when the DSECU is unable to set the target traveling line Ld based on "at least one of the left white line and the right white line" recognized/detected by the camera sensor 17b.

When the TJA performing condition is not satisfied, the CPU makes a "No" determination at step 805 and proceeds to step 820 to cancel (stop) the following-travel steering control. Thereafter, the CPU proceeds to step 895 to tentatively terminate the present routine.

In contrast, when the TJA performing condition of the following-travel steering control is satisfied, the CPU makes a "Yes" determination at step 805 and proceeds to step 810 to acquire/obtain the target object information on each one or more of the target object(s) (n) which the surroundings monitoring sensor 17 has acquired/obtained.

Thereafter, the CPU proceeds to step 815 to determine/selects/specify "a candidate of the following-travel steering target vehicle (target candidate vehicle)" from among one or more of the preceding vehicle(s) in accordance with the above-described steps 1B to 3B (refer to the above-described determining method for the following-travel steering target vehicle). Furthermore, the CPU determines whether or not the target candidate vehicle is present at step 815. When the target candidate vehicle is not present, the CPU makes a "No" determination at step 815 and proceeds to step 820 to cancel (stop) the following-travel steering control. Thereafter, the CPU proceeds to step 895 to tentatively terminate the present routine.

In contrast, when the target candidate vehicle is present, the CPU makes a "Yes" determination at step 815 and proceeds to step 825 to acquire/obtain the target object ID of that target candidate vehicle, to store that acquired/obtained target object ID in the RAM.

Thereafter, the CPU proceeds to step 830 to determine whether or not a "previous following-travel steering target vehicle" is still present as the preceding vehicle at the present time point. The "previous following-travel steering target vehicle" is the preceding vehicle specified as the following-travel steering target vehicle when the present routine was executed the predetermined time before the present time point (i.e., at a time of previous execution of the present routine). The preceding vehicle specified as the following-travel steering target vehicle at the time of previous execution of the present routine is the already-present following-travel steering target vehicle (already-present target vehicle). More specifically, the CPU determines whether or not the target object information obtained at step 810 includes "the same target object ID as the target object ID of the previous following-travel steering target vehicle".

Now, it is assumed that the performing condition of the following-travel steering control (TJA) was not satisfied at the time of previous execution and the performing condition of the following-travel steering control (TJA) becomes satisfied at the time of present execution (that is, at the present time point). In this case, since the previous following-travel steering target vehicle is not present, the preceding vehicle having the same target object ID as the target object ID of the previous following-travel steering target object is not present. Therefore, in this case, the CPU makes a "No" determination at step 830 and proceeds to step 835 to set a "final following-travel steering target vehicle" to the target candidate vehicle. More specifically, the CPU acquires/obtains the target object ID of the target candidate vehicle as the target object ID of the final following-travel steering target vehicle, and stores that acquired/objected target object ID in the RAM as the the target object ID of the (final) following-travel steering target vehicle.

Thereafter, the CPU proceeds to step 840 to produce/generate the traveling trajectory based on the target object information on the (final) following-travel steering target object. Then, the CPU proceeds to step 845 to set the traveling trajectory which has been produced/generated at step 840 as the target traveling line and to control the steering angle of the own vehicle SV so as to cause the own vehicle SV to travel along the target traveling line. That is, the CPU performs the following-travel steering control with the use of the traveling trajectory of the preceding vehicle which has been finally specified as the (final) following-travel steering target vehicle. Thereafter, the CPU proceeds to step 895 to tentatively terminate the present routine.

In contrast, it is now assumed that the performing condition of the following-travel steering control was satisfied in the previous calculation and the following-travel steering control was performed at the time of previous execution. In addition, it is assumed that the target candidate vehicle is present at the time of present execution. In this case, since the previous following-travel steering target vehicle is present, the CPU proceeds to step 830 and makes a "Yes" determination at that step 830. Thereafter, the CPU proceeds to step 850 to determine whether or not the target object ID of the target candidate vehicle which has been acquired/obtained at step 825 is the same as "the target object ID of the previous following-travel steering target vehicle". That is, the CPU determines whether or not the target candidate vehicle is a vehicle which is the same vehicle as the previous following-travel steering target vehicle (more precisely, whether or not one particular (single) vehicle is regarded as each of those vehicles).

When "the target object ID of the target candidate vehicle" and "the target object ID of the previous following-travel steering target vehicle" are not the same as each other, the CPU makes a "No" determination at step 850 and proceeds to step 855 to set the target candidate vehicle as the "final following-travel steering target vehicle" (i.e, the CPU sets the "final following-travel steering target vehicle" to the target candidate vehicle). More specifically, the CPU acquires/obtains the target object ID of the target candidate vehicle as the target object ID of the final following-travel steering target vehicle, and stores that acquired/obtained target object ID in the RAM as the target object ID of the (final) following-travel steering target vehicle. Therefore, (a vehicle of) "the following-travel steering target vehicle" changes from "the previous following-travel steering target vehicle" to "the target candidate vehicle having the target object ID different from the target object ID of the previous following-travel steering target vehicle". Therefore, when the CPU proceeds to step 860 thereafter, the CPU resets/clears the traveling trajectory which has been produced/generated up to the present time point. In other words, the CPU does not use/treat the target object information of the previous following-travel steering target object (the already-present target vehicle) as the target object information of the final following-travel steering target vehicle.

The CPU sequentially executes the processes of step 840 and step 845. As a result, the traveling trajectory of "the target candidate vehicle" which has been set as "the final following-travel steering target vehicle" at step 855 is newly produced/generated and the following-travel steering control is performed with the use of the target traveling line to which that produced/generated traveling trajectory is adopted. Thereafter, the CPU proceeds to step 895 to tentatively terminate the present routine.

When "the target object ID of the target candidate vehicle" and "the target object ID of the previous following-travel steering target vehicle" are the same as each other at the time point at which the CPU executes the process of the step 850, the CPU makes a "Yes" determination at step 850 and proceeds to step 865 to determine whether or not "the traveling trajectory of the previous following-travel steering target vehicle" has successfully been extrapolated. More specifically, when time-series data sets of the target object information of the previous following-travel steering target vehicle are not enough/sufficient to produce/generate the traveling trajectory, the CPU determines that "the traveling trajectory of the previous following-travel steering target vehicle" has not been successfully extrapolated. When the time-series data sets of the target object information of the previous following-travel steering target vehicle are enough/sufficient to produce/generate the traveling trajectory, the CPU determines that "the traveling trajectory of the previous following-travel steering target vehicle" has been successfully extrapolated.

If "the traveling trajectory of the previous following-travel steering target vehicle" has not been successfully extrapolated by the present time point, the determination of whether or not "the specific condition (the condition of erroneously handing over target object ID)" described above is satisfied is unable to be made with a high degree of accuracy. Therefore, in this case, the CPU makes a "No"

determination at step 865 to sequentially proceed to step 835, step 840 and step 845. As a result, the following-travel steering control is performed with the use of the target traveling line to which the traveling trajectory of the "target candidate vehicle" having the same target object ID as "the target object ID of the previous following-travel steering target vehicle" is adopted.

In contrast, when "the traveling trajectory of the previous following-travel steering target vehicle" has been successfully extrapolated by the present time point, the CPU makes a "Yes" determination at step 865 to proceed to step 870. The CPU sequentially executes the processes of the step 870, step 875 and step 880, thereby determining whether or not the specific condition described above is satisfied.

The CPU proceeds to step 870 to determine whether or not "the target candidate vehicle" is sufficiently apart from the traveling trajectory Lp (already-present traveling trajectory Lp) which has been produced/generated up to the present time point. That is, the CPU determines whether or not "the condition 1 included in the specific condition" is satisfied.

More specifically, the CPU calculates the above-described first distance Dy1 based on the target object information, and determines whether or not the first distance Dy1 is equal to or greater than the first predetermined distance Dth1 When the first distance Dy1 is equal to or greater than the first predetermined distance Dth1, the CPU determines that the target candidate vehicle is traveling outside of the first predetermined area determined based on the already-present traveling trajectory Lp which is the traveling trajectory of the previous following-travel steering target vehicle (i.e., based on the target traveling line up to the present time point). That is, when the first distance Dy1 is equal to or greater than the first predetermined distance Dth1, the CPU determines that the target candidate vehicle is sufficiently apart from the already-present traveling trajectory Lp. In contrast, when the first distance Dy1 is smaller than the first predetermined distance Dth1, the CPU determines that the target candidate vehicle is traveling within the first predetermined area.

When the target candidate vehicle is sufficiently apart from the already-present traveling trajectory Lp, the CPU makes a "Yes" determination at step 870 and proceeds to step 875 to determine whether or not an other preceding vehicle having the target object ID different from the target object ID of the target candidate vehicle is present on/along the already-present traveling trajectory Lp. That is, the CPU determines whether or not "the condition 2 included in the specific condition" is satisfied.

More specifically, the CPU calculates the above-described second distance Dy2 based on the target object information, and determines whether or not the second distance Dy2 is equal to or smaller than the second predetermined distance Dth2. When the second distance Dy2 is equal to or smaller than the second predetermined distance Dth2, the CPU determines that there is "the other vehicle different from the target candidate vehicle" which is traveling within the second predetermined area determined based on the already-present traveling trajectory Lp which is the traveling trajectory of the previous following-travel steering target vehicle (i.e., based on the target traveling line up to the present time point). That is, when the second distance Dy2 is equal to or smaller than the second predetermined distance Dth2, the CPU determines that "the other preceding vehicle" is present on/along the already-present traveling trajectory Lp. In contrast, when the second distance Dy2 is greater than the second predetermined distance Dth2, the CPU determines that the other preceding vehicle is not present on/along the already-present traveling trajectory Lp.

When the other preceding vehicle is present on/along the already-present traveling trajectory Lp, the CPU makes a "Yes" determination at step 875. Then, the CPU proceeds to step 880 to determine whether or not "the other preceding vehicle which has been determined to be present on/along the already-present traveling trajectory (that is, the vehicle-on-trajectory)" is present in the vicinity of "the target candidate vehicle". In other words, the CPU determines whether or not "the condition 3 included in the specific condition" is satisfied.

More specifically, the CPU calculates the above-described third distance Dx1, and determines whether or not that third distance Dx1 is equal to or smaller than the third predetermined distance Dth3. When the third distance Dx1 is equal to or smaller than the third predetermined distance Dth3, the CPU determines that the vehicle-on-trajectory is present in the vicinity of the target candidate vehicle. When the third distance Dx1 is greater than the third predetermined distance Dth3, the CPU determines that the vehicle-on-trajectory is not present in the vicinity of the target candidate vehicle.

When the vehicle-on-trajectory is present in the vicinity of the target candidate vehicle, the CPU makes a "Yes" determination at step 880. In this case, since all of the above-described conditions 1 to 3 are satisfied, the CPU determines that the above-described specific condition is satisfied. Then, the CPU proceeds to step 885 to set "the final following-travel steering target vehicle" to the vehicle-on-trajectory. More specifically, the CPU acquires/obtains the target object ID of the vehicle-on-trajectory as the target object ID of the final following-travel steering target vehicle, and stores that acquired/obtained target object ID in the RAM as the target object ID of the final following-travel steering target vehicle. In this case, the CPU does not reset/clear the already-present traveling trajectory Lp. In other words, the CPU stores the position coordinate data of the target object (the already-present target vehicle) which has been the following-travel steering target vehicle up to the present time point in the RAM as the position coordinate data of the vehicle-on-trajectory. That is, the CPU treats/uses the target object information of the already-present target vehicle as the target object information of the vehicle-on-trajectory.

Thereafter, the CPU proceeds to step 840 to produce/generate the traveling trajectory by using the new position coordinate data included in the target object information of "the final following-travel target vehicle (that is, the vehicle-on-trajectory)" that is set at step 885, and the position coordinate data which has been stored as the position coordinate data of the vehicle-on-trajectory at step 885. Thereafter, the CPU executes the process of step 845. As a result, the already-present traveling trajectory is not reset/cleared, and the steering control is performed with the use of the target traveling line. This target traveling line is the "traveling trajectory of the final following-travel steering target vehicle" which is produced/generated in such a manner that the traveling trajectory is continuous with the already-present traveling trajectory Lp. Thereafter, the CPU proceeds to step 895 to tentatively terminate the present routine.

It should be noted that when the target candidate vehicle is not sufficiently apart from the already-present traveling trajectory Lp at the time point at which the CPU executes the process of step 870, the CPU makes a "No" determination at step 870 to sequentially execute the processes of step 835, step 840, and step 845. Thereafter, the CPU proceeds to step 895 to tentatively terminate the present routine.

Furthermore, when the other preceding vehicle is not present on/along the already-present traveling trajectory Lp at the time point at which the CPU executes the process of step 875, the CPU makes a "No" determination at step 875 to sequentially execute the processes of step 835, step 840, and step 845. Thereafter, the CPU proceeds to step 895 to tentatively terminate the present routine.

In addition, when the vehicle-on-trajectory is not present in the vicinity of the target candidate vehicle at the time point at which the CPU executes the process of step 880, the CPU makes a "No" determination at step 880 to sequentially execute the processes of step 835, step 840, and step 845. Thereafter, the CPU proceeds to step 885 to tentatively terminate the present routine.

Therefore, when the "No" determination is made at any one of steps 870 to 880 (that is, when the specific condition is not satisfied), the traveling trajectory Lp is updated based on the target object information of the target candidate vehicle to which "the same target object ID as the target object ID of the previous following-travel steering target vehicle" is assigned/given, and the following-travel steering control is performed with the use of the traveling target line which is equal to the updated traveling trajectory Lp.

Modified Examples

Although each of the embodiments of the present invention has been specifically described above, the present invention is not limited to the above embodiments, and various modified examples based on the technical idea within the scope of the present invention can be adopted.

For example, although the present embodiment apparatus is configured to perform the lane keeping control only while the following-travel inter-vehicle-distance control is being performed, it may be configured to perform the lane keeping control even while the following-travel inter-vehicle-distance control is not being performed.

For example, the present embodiment apparatus may acquire/obtain the position information, the speed information, and the like, of one or more of the other vehicles including the following-travel steering target vehicle and the inter-vehicle-distance target vehicle through an inter-vehicle communication. More specifically, for example, the other vehicle may transmit the position information of the other vehicle acquired by using the navigation device of the other vehicle to the own vehicle SV together with a vehicle identification signal for identifying the other vehicle itself, and the own vehicle may acquire/obtain the position information of the following-travel steering target vehicle and/or the inter-vehicle-distance target vehicle based on the information transmitted from the other vehicle.

Furthermore, the method for producing/generating the traveling trajectory is not limited to the above-described example, and various well-known methods can be adopted. That is, any one of methods for generating the traveling trajectory which is capable of generating a curve line which approximates the traveling trajectory (the preceding vehicle trajectory) of the following-travel steering target vehicle is used. For example, the traveling trajectory may be generated by the use of a Karman filter. In addition, for example, when the target object information which the DS CU has obtained every time a predetermined detection time elapses is the "one sensor detection target object information", the traveling trajectory may be generated in such a manner that a degree to which that target object information is reflected in the traveling trajectory is greater than a degree to which two sensors detection target object information is reflected in the traveling trajectory.

Furthermore, the above-described specific condition may be set so as to be satisfied when both of the above-described condition 1 and the above-described condition 2 are satisfied.

What is claimed is:

1. A driving support apparatus of a host vehicle, the driving support apparatus comprising:
   a processor configured to:
   recognize one or more preceding vehicles traveling in a front area of theft host vehicle;
   acquire target object information including position information indicative of a longitudinal distance and a lateral position of each of the one or more preceding vehicles with respect to the host vehicle;
   select a target candidate vehicle from among the one or more preceding vehicles based on the target object information and a traveling direction of the host vehicle which is extrapolated based on a driving state of the host vehicle, the target candidate vehicle being a candidate for the host vehicle to follow;
   when the target candidate vehicle is selected as the target for the vehicle to follow while the host vehicle is not following another vehicle, determine that the selected target candidate vehicle is the target for the host vehicle to follow;
   when the target candidate vehicle is selected while the host vehicle is following a vehicle, determine whether or not three conditions have been satisfied simultaneously, wherein the three conditions include:
   a first condition satisfied when a first distance in a lane width direction between the selected target candidate vehicle and a host vehicle traveling trajectory that has been produced up to a present time point is equal to or greater than a predetermined first threshold distance,
   a second condition satisfied when a second distance in the lane width direction between the other vehicle that is different from the selected target candidate vehicle and the host vehicle traveling trajectory is equal to or less than a second predetermined threshold distance, and
   a third condition satisfied when a third distance in the lane longitudinal direction between the selected target candidate vehicle and the other vehicle is equal to or less than a third predetermined threshold distance;
   when the three conditions have been satisfied simultaneously while the host vehicle is following the other vehicle, determine that the other vehicle is the target for the host vehicle to follow;
   when the three conditions have not been satisfied simultaneously while the host vehicle is following a vehicle, determine that the selected candidate target candidate vehicle is the target for the host vehicle to follow; and
   perform control of the host vehicle in such a manner that the host vehicle follows the determined target for the vehicle to follow.

2. The vehicle driving support control apparatus according to claim 1, wherein the processor is configured to perform following-travel steering target control while using said position information included in said target object information of an already-present target vehicle as said position information included in said target object information of said the other vehicle, when determining that said three conditions are satisfied simultaneously to determine said the other vehicle as the target for the host vehicle to follow, the following-travel steering target control being control to change a steering angle of the host vehicle in such a manner that the host vehicle travels along a target traveling line according to a traveling trajectory of a vehicle determined as the target for the host vehicle to follow.

3. The vehicle driving support control apparatus according to claim 1, further comprising: a radar sensor and a camera sensor, wherein the processor is further configured to:
   acquire target object information based on at least one set of: radar sensor detection information acquired from the one or more preceding vehicles by the radar sensor, and camera sensor detection information acquired from the one or more preceding vehicles by the camera sensor;
   generate the traveling trajectory based on a plurality of sets of the target object information acquired from the target vehicle; and
   generate the host vehicle traveling trajectory in such a manner that a degree to which one sensor detection target object information is reflected in the traveling trajectory, when the target object information is the one sensor detection target object information is smaller than a degree to which two sensors detection target object information is reflected in the traveling trajectory, when the target object information is the two sensors detection target object information, the one sensor detection target object information being information detected based on only either the radar sensor detection information or the camera sensor detection information, and the two sensors detection target object information being information detected based on both of the radar sensor detection information and the camera sensor detection information.

4. A method comprising:
   recognizing one or more preceding vehicles traveling in a front area of a host vehicle;
   acquiring target object information including position information indicative of a longitudinal distance and a lateral position of each of the one or more preceding vehicles with respect to the host vehicle;
   selecting a target candidate vehicle from among the one or more preceding vehicles based on the target object information and a traveling direction of the host vehicle which is extrapolated based on a driving state of the host vehicle, the target candidate vehicle being a candidate for the host vehicle to follow;
   when the target candidate vehicle is selected as the target for the vehicle to follow while the host vehicle is not following another vehicle, determining that the selected target candidate vehicle is the target for the host vehicle to follow;
   when the target candidate vehicle is selected while the host vehicle is following a vehicle, determining whether or at least three conditions have been satisfied simultaneously, wherein the three conditions include:
      a first condition satisfied when a first distance in a lane width direction between the selected target candidate vehicle and a host vehicle traveling trajectory that has been produced up to a present time point is equal to or greater than a predetermined first threshold distance,
      a second condition satisfied when a second distance in the lane width direction between the other vehicle that is different from the selected target candidate vehicle and the host vehicle traveling trajectory is equal to or less than a second predetermined threshold distance;
      a third condition satisfied when a third distance in the lane longitudinal direction between the selected target candidate vehicle and the other vehicle is equal to or less than a third predetermined threshold distance;
   when the three conditions have been satisfied simultaneously while the host vehicle is following another vehicle, determining that the other vehicle is the target for the host vehicle to follow;
   when the three conditions have not been satisfied simultaneously while the host vehicle is following a vehicle, determining that the selected candidate target candidate vehicle is the target for the host vehicle to follow; and
   performing control of the host vehicle in such a manner that the host vehicle follows the determined target for the vehicle to follow.

5. A driving support apparatus of a host vehicle, the driving support apparatus comprising:
   a processor; and
   a surroundings monitoring sensor configured to acquire information on at least a road in front of the host vehicle and a three-dimensional object which is present in the road, to calculate target object information on a target object, the target object information includes a longitudinal distance and a lateral position, and to output the calculated target object information,
   the processor configured to:
      acquire target object information from the surroundings monitoring sensor,
      recognize one or more preceding vehicles traveling in a front area of the host vehicle based on the target object information;
      select a target candidate vehicle from among the one or more preceding vehicles based on the target object information and a traveling direction of the host vehicle which is extrapolated based on a driving state of the host vehicle, the target candidate vehicle being a candidate for the host vehicle to follow;
      when the target candidate vehicle is selected as the target for the vehicle to follow while the host vehicle is not following a vehicle, determine that the selected target candidate vehicle is the target for the host vehicle to follow;
      when recognizing another vehicle which is separated from the target object recognized as the target candidate vehicle while the host vehicle is following a vehicle, determine whether or not three conditions have been satisfied simultaneously, wherein the three conditions include:
         a first condition satisfied when a first distance in a lane width direction between the target candidate vehicle and a host vehicle traveling trajectory that has been produced up to a present time point is equal to or greater than a predetermined first threshold distance,
         a second condition satisfied when a second distance in the lane width direction between the other vehicle and the host vehicle traveling trajectory is equal to or less than a second predetermined threshold distance, and a third condition satisfied when a third distance in the lane longitudinal direction between the target candidate vehicle and the other vehicle is less than a third predetermined threshold distance;

when the three conditions have been satisfied simultaneously determine that the other vehicle is the target for the host vehicle to follow;

when the three conditions have not been satisfied simultaneously, determine that the target candidate vehicle is the target for the host vehicle to follow; and perform control of the host vehicle in such a manner that the host vehicle follows the determined target for the vehicle to follow.

* * * * *